(12) United States Patent
Choi et al.

(10) Patent No.: US 10,838,874 B2
(45) Date of Patent: Nov. 17, 2020

(54) MEMORY SYSTEM MANAGING MAPPING INFORMATION CORRESPONDING TO WRITE DATA AND OPERATION METHOD THEREOF

(71) Applicant: SK hynix Inc., Gyeonggi-do (KR)

(72) Inventors: Hae-Gi Choi, Gyeonggi-do (KR); Kyeong-Rho Kim, Gyeonggi-do (KR); Sung-Kwan Hong, Seoul (KR); Su-Chang Kim, Gyeonggi-do (KR); Yeong-Sik Yi, Seoul (KR); Ji-Hoon Yim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 217 days.

(21) Appl. No.: 16/002,766

(22) Filed: Jun. 7, 2018

(65) Prior Publication Data

US 2019/0138454 A1 May 9, 2019

(30) Foreign Application Priority Data

Nov. 8, 2017 (KR) .......................... 10-2017-0148005

(51) Int. Cl.
*G06F 12/00* (2006.01)
*G06F 12/1009* (2016.01)
*G06F 12/10* (2016.01)

(52) U.S. Cl.
CPC .......... *G06F 12/1009* (2013.01); *G06F 12/10* (2013.01); *G06F 2212/1008* (2013.01); *G06F 2212/657* (2013.01)

(58) Field of Classification Search
CPC .............................. G06F 12/10; G06F 12/1009
USPC ..................................................... 711/203, 206
See application file for complete search history.

(56) References Cited

U.S. PATENT DOCUMENTS

| 2014/0143476 A1* | 5/2014 | Sela ..................... G06F 3/0619 711/103 |
| 2014/0281188 A1* | 9/2014 | Kwon ................ G06F 12/1009 711/104 |
| 2018/0052768 A1* | 2/2018 | Bae ..................... G06F 12/0246 |

FOREIGN PATENT DOCUMENTS

| KR | 1020110097937 | 8/2011 |
| KR | 1020140113176 | 9/2014 |

* cited by examiner

*Primary Examiner* — Reginald G Bragdon
*Assistant Examiner* — Michael L Westbrook
(74) *Attorney, Agent, or Firm* — IP & T Group LLP

(57) ABSTRACT

A memory system includes a non-volatile memory device including a plurality of memory blocks; and a controller comprising a volatile memory and configured to: store a plurality of write data delivered from a host in the memory blocks to the plurality of memory blocks; and managing mapping information corresponding to the stored write data in the volatile memory, wherein the controller is configured to check whether the plurality of write data are grouped into a transaction, selectively set a transaction flag to the mapping information based on a check result; and selectively store the mapping information in the memory blocks when the transaction flag is not set.

19 Claims, 14 Drawing Sheets

FIG. 7A
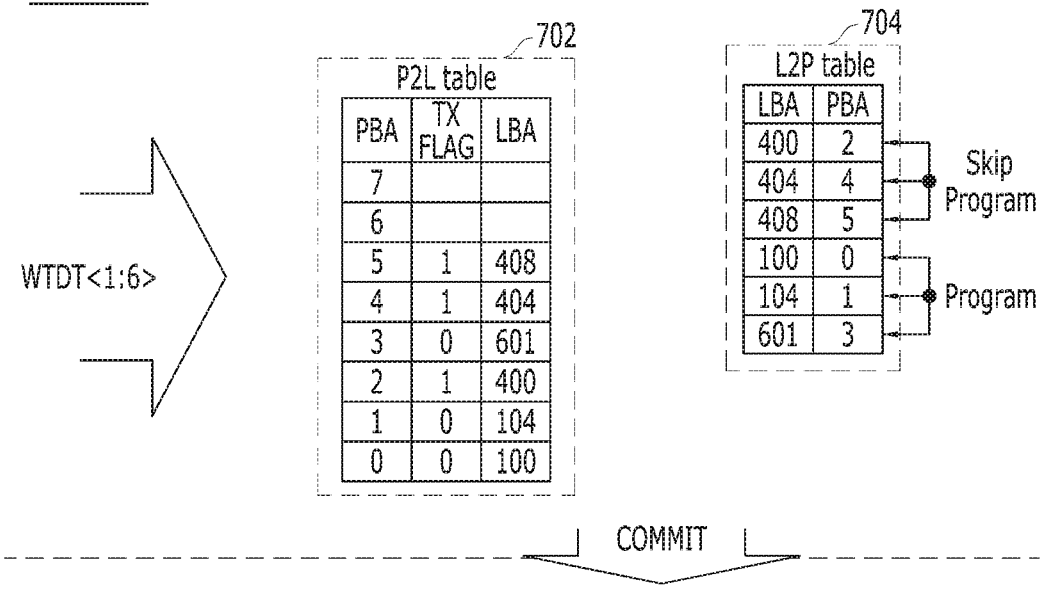
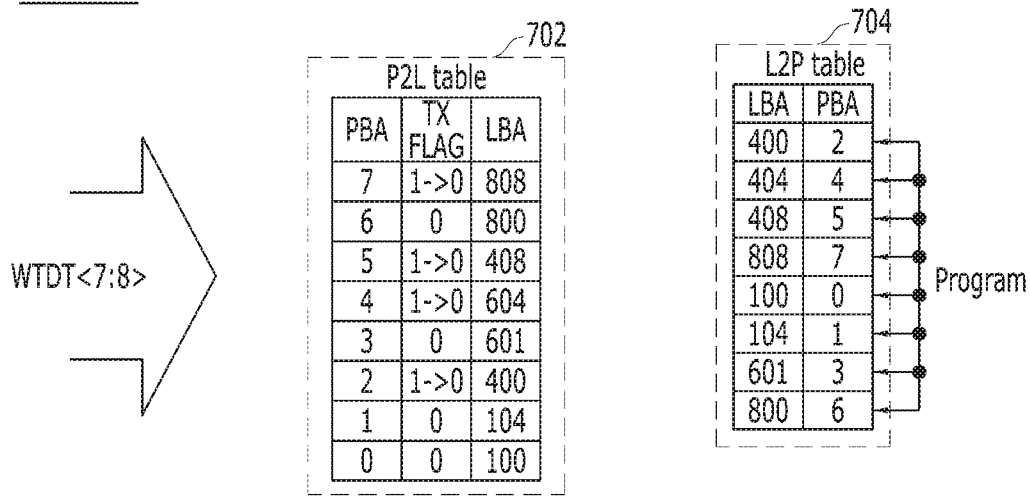

FIG. 7B
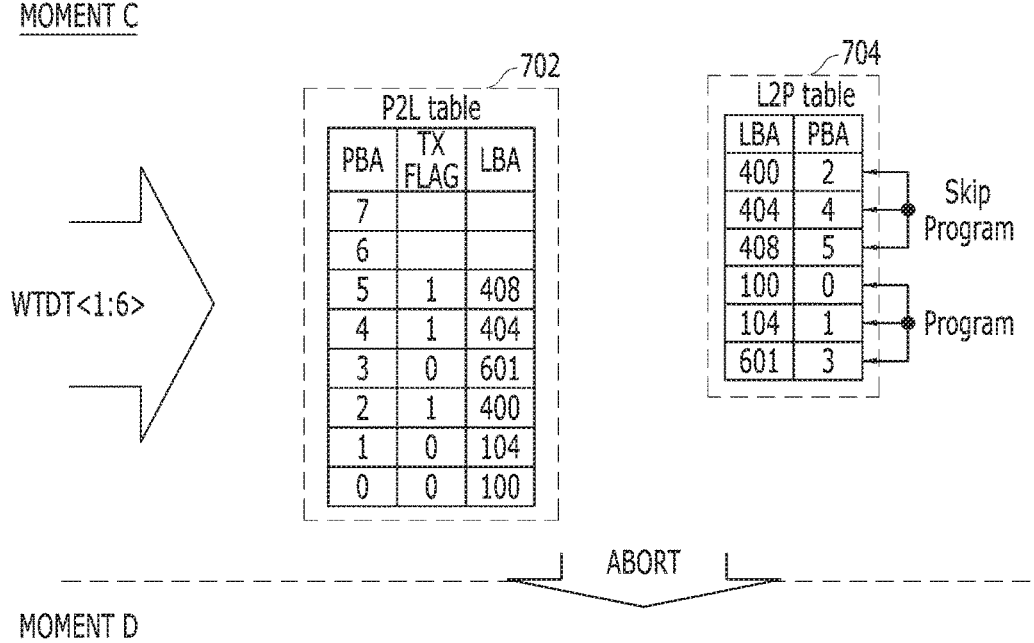
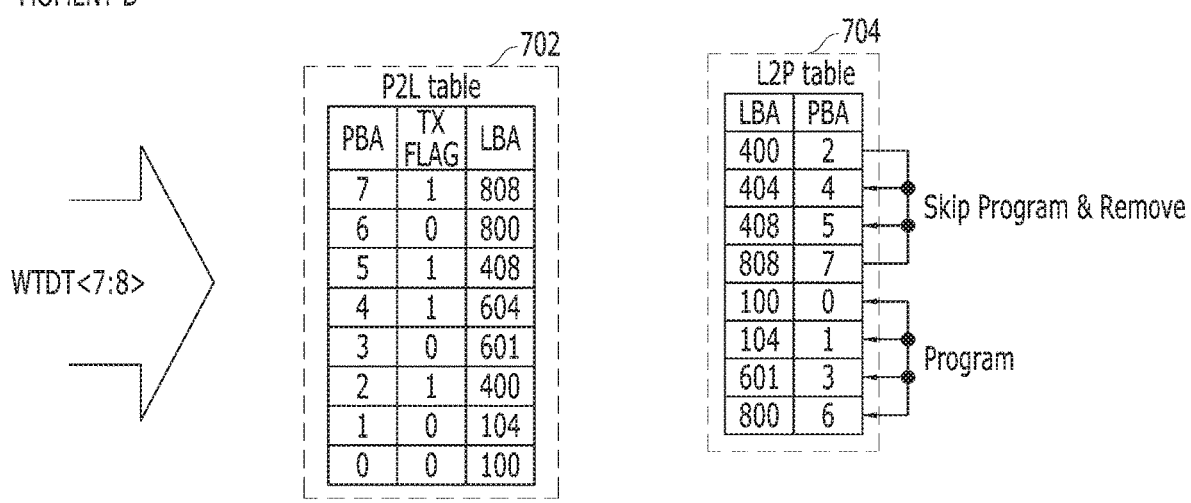

MEMORY SYSTEM MANAGING MAPPING INFORMATION CORRESPONDING TO WRITE DATA AND OPERATION METHOD THEREOF

CROSS-REFERENCE TO RELATED APPLICATIONS

The present application claims priority under 35 U.S.C. § 119(a) to Korean Patent Application No. 10-2017-0148005 filed on Nov. 8, 2017, the disclosure of which is incorporated herein by reference in its entirety.

BACKGROUND

1. Field

Various exemplary embodiments of the present invention relate to a memory system. Particularly, exemplary embodiments relate to a controller capable of efficiently managing data, and an operating method thereof.

2. Description of the Related Art

The paradigm for computing environments moves toward ubiquitous computing which provides people or users to use their or commonly supplied computing systems anytime anywhere. In the era of ubiquitous computing, the demand for portable electronic devices, such as mobile phones, digital cameras and laptop computers are soaring. Those electronic devices generally include a memory system using a memory device as a data storage device. The data storage device may be used as a main memory unit or an auxiliary memory unit of a portable electronic device.

Since the data storage device is using a memory device does not have a mechanical driving unit (e.g., a mechanical arm with a read/write head) as compared with a hard disk device, it may have excellent stability and durability. Also, the data storage device can have a quick data access rate with low power consumption than the hard disk device. Non-limiting examples of the data storage device having such advantages include Universal Serial Bus (USB) memory devices, memory cards of diverse interfaces, Solid-State Drives (SSD) and the like.

SUMMARY

Various embodiments of the present invention are directed to a memory system capable of managing efficiently mapping information responsive to plural write data.

In accordance with an embodiment of the present invention, a memory system includes: a non-volatile memory device including a plurality of memory blocks; and a controller comprising a volatile memory and configured to: store a plurality of write data delivered from a host in the memory blocks to the plurality of memory blocks; and managing mapping information corresponding to the stored write data in the volatile memory, wherein the controller is configured to check whether the plurality of write data are grouped into a transaction, selectively set a transaction flag to the mapping information based on a check result; and selectively store the mapping information in the memory blocks when the transaction flag is not set.

The mapping information includes first mapping information which is logical to physical information for the write data stored in the memory blocks and second mapping information which is physical to logical information, and the controller is configured to: check whether the plurality of write data are grouped into the transaction; selectively set the transaction flag to the second mapping information based on a check result; and selectively store the first mapping information corresponding to the second mapping information in the memory blocks when the transaction flag is not set to the second mapping information.

The controller may be configured to divide the write data into first write data which are grouped into the transaction and second write data which are not grouped into the transaction based on whether or not each of the write data is grouped into the transaction whenever the write data are stored in the memory blocks, and set the transaction flag to the second mapping information corresponding to the first write data among the second mapping information managed in the volatile memory.

The controller may be configured to select just the first mapping information corresponding to the second mapping information to which the transaction flag is not set among the entire second mapping information managed in the volatile memory and store the selected first mapping information in the memory blocks at each first set moment.

The controller may be configured not to store the first mapping information corresponding to the second mapping information to which the transaction flag is set among the entire second mapping information managed in the volatile memory in the memory blocks and continuously manage the first mapping information in the volatile memory at the first set moment.

When a transaction of the first write data is committed, the controller may be configured to clears the transaction flag, which is set to the second mapping information corresponding to the first write data before a commit moment of the transaction, to a state where the transaction flag is not set.

When a transaction of the first write data is aborted, the controller may be configured to retain the transaction flag, which is set to the second mapping information corresponding to the first write data before an abort moment of the transaction, even after the abort moment of the transaction, and remove the first mapping information and second mapping information which correspond to the first write data from the volatile memory.

The controller may be configured to select just the second mapping information to which the transaction is not set among the entire second mapping information managed in the volatile memory and store the selected second mapping information in the memory blocks at each second set moment.

The controller may be configured to store the entire second mapping information managed in the volatile memory together with information representing whether the transaction flag is set in the memory blocks at each second set moment.

The controller may be configured to check whether each of the write data is grouped into the transaction in response to transaction ID information included in write commands corresponding to the write data.

In accordance with an embodiment of the present invention, an operating method of a memory system including a non-volatile memory device including a plurality of memory blocks and a controller including a volatile memory, the operating method may include: a first storing step of storing, by controller, a plurality of write data delivered from a host in the memory blocks; and a managing step of managing, by controller, mapping information, corresponding to the stored write data, stored in the volatile memory, wherein the managing step includes: a first check step of checking whether the write data are grouped into a transaction; a set step of selectively setting a transaction flag to the mapping information with reference to a result of the first check step; a second check step of checking whether the transaction flag is set to the mapping information after the set step; and a second storing step of selectively storing the mapping information in the memory blocks with reference to a result of the second check step.

The mapping information may include first mapping information which is logical to physical information for the write data stored in the memory blocks and second mapping information which is physical to logical information, and the set step may be performed by selectively setting the transaction flag to the second mapping information with reference to the result of the first check step, the second check step may be performed by checking whether the transaction flag is set to the second mapping information, and the second storing step may be performed by selectively storing the first mapping information corresponding to the second mapping information in the memory blocks with reference to the result of the second check step.

The first check step may be performed by dividing the write data into first write data which are grouped into the transaction and second write data which are not grouped into the transaction based on a result of checking whether each of the write data is grouped into the transaction whenever the write data are stored in the memory blocks, and the set step may include setting the transaction flag to the second mapping information corresponding to the first write data among the second mapping information managed in the volatile memory with reference to the result of the first check step.

The second storing step is performed by selecting just the first mapping information corresponding to the second mapping information to which the transaction flag is not set among the entire second mapping information managed in the volatile memory with reference to the result of the second check step and storing the selected first mapping information in the memory blocks at each first set moment.

The second storing step is performed by not storing the first mapping information corresponding to the second mapping information to which the transaction flag is set among the entire second mapping information managed in the volatile memory in the memory blocks with reference to the result of the second check step and continuing to manage the first mapping information in the volatile memory at the first set moment.

The operating method may further include a third check step of checking whether a transaction of the first write data is committed, and the set step is performed by clearing the transaction flag, which is set to the second mapping information corresponding to the first write data before a commit moment of the transaction, to a state where the transaction flag is not set when it is checked that the transaction of the first write data is committed, with reference to a result of the third check step.

The operating method may further include a fourth check step of checking whether a transaction of the first write data is aborted; and a deleting step of deleting the first mapping information and second mapping information which correspond to the first write data from the volatile memory when it is checked that the transaction of the first write data is aborted, with reference to a result of the fourth check step after the set step, and the set step is performed by retaining the transaction flag, which is set to the second mapping information corresponding to the first write data before an abort moment of the transaction, even after the abort moment of the transaction when it is checked that the transaction of the first write data is aborted, with reference to the result of the fourth check step.

The second storing step may be performed by selecting just the second mapping information to which the transaction is not set among the entire second mapping information managed in the volatile memory and storing the selected second mapping information in the memory blocks at each second set moment.

The second storing step may be performed by storing the entire second mapping information managed in the volatile memory together with information representing whether the transaction flag is set in the memory blocks at each second set moment.

The first check step may be performed by checking whether each of the write data is grouped into the transaction in response to transaction ID information included in write commands corresponding to the write data.

In accordance with an embodiment of the present invention, a memory system may include a non-volatile memory device including a plurality of memory blocks; and a controller, electrically coupled with the non-volatile memory device and having a volatile memory device, and configured to: write a write data in at least one memory block based on a mapping information stored in volatile memory; check whether a plurality of write data are grouped into a transaction, selectively sets a transaction flag to corresponding mapping information based on a check result; and selectively updates the mapping information, which is not set by the transaction flag, to the memory blocks.

BRIEF DESCRIPTION OF THE DRAWINGS

The description herein makes reference to the accompanying drawings wherein like reference numerals refer to like parts throughout the several views, and wherein:

FIGS. 7A and 7B are diagrams illustrating an example of an operation of a memory system for managing mapping information corresponding to a plurality of write data grouped into a transaction shown in FIG. 6;

DETAILED DESCRIPTION

Figure 1:
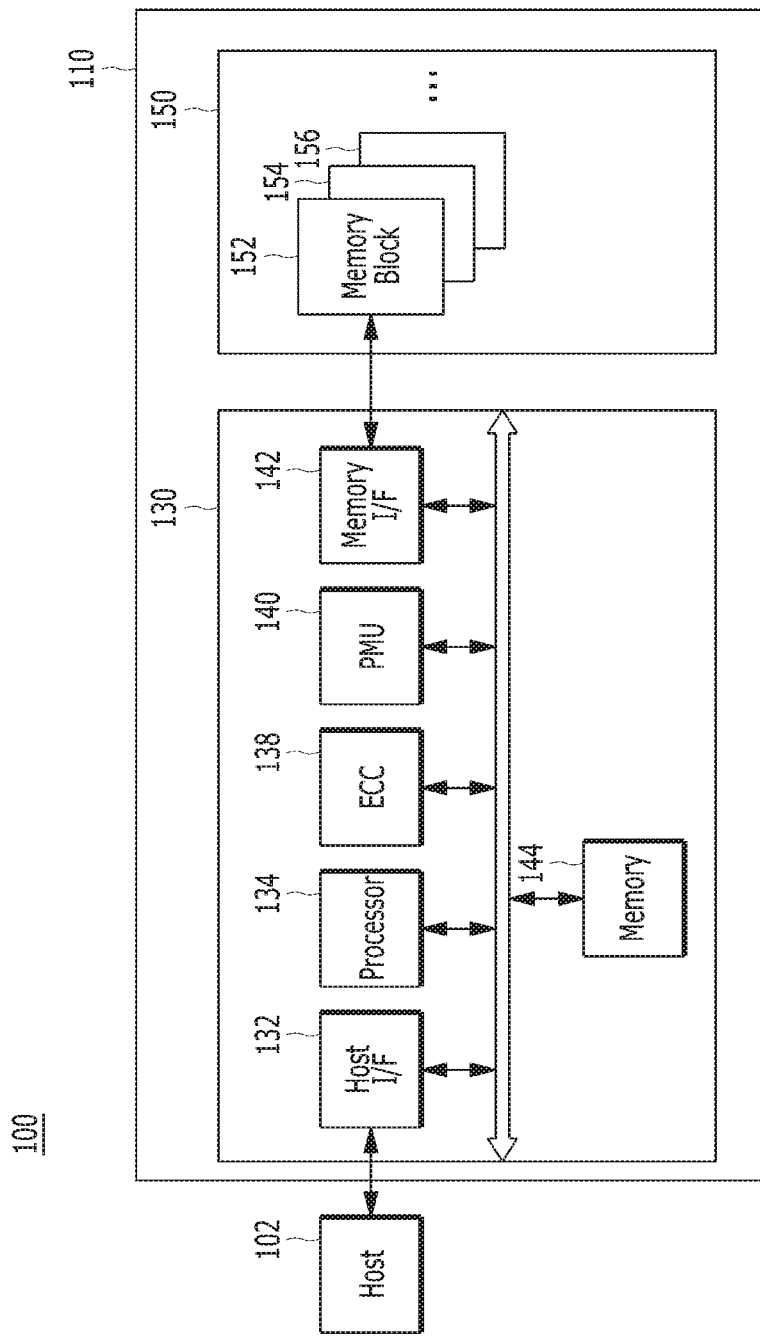
FIG. 1 is a block diagram illustrating a data processing system including a memory system in accordance with an example of the disclosure.

Various examples of the disclosure are described below in more detail with reference to the accompanying drawings. The disclosure may be embodied in different other embodiments, forms and variations thereof and should not be construed as being limited to the embodiments set forth herein. Rather, the described embodiments are provided so that this disclosure will be thorough and complete, and will fully convey the disclosure to those skilled in the art to which this invention pertains. Throughout the disclosure, like reference numerals refer to like parts throughout the various figures and examples of the disclosure.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include, for example, a portable electronic device such as a mobile phone, an MP3 player and a laptop computer or an electronic device such as a desktop computer, a game player, a TV, a projector and the like.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Examples of suitable storage devices include a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device such as a dynamic random access memory (DRAM) and a static RAM (SRAM) and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM) and a flash memory.

The memory system 110 may include a memory device 150 which stores data to be accessed by the host 102, and a controller 130 which may control storage of data in the memory device 150.

The controller 130 and the memory device 150 may be integrated into a single semiconductor device, which may be included in the various types of memory systems as exemplified above.

The memory system 110 may be configured as a part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3D television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while an electrical power is not supplied. The memory device 150 may store data provided from the host 102 through a write operation, and provide data stored therein to the host 102 through a read operation. The memory device 150 may include a plurality of memory blocks 152 to 156, each of the memory blocks 152 to 156 may include a plurality of pages. Each of the plurality of pages may include a plurality of memory cells to which a plurality of word lines (WL) are electrically coupled.

The controller 130 may control overall operations of the memory device 150, such as read, write, program and erase operations. The controller 130 of the memory system 110 may control the memory device 150 in response to a request from the host 102. The controller 130 may provide the data, read from the memory device 150, to the host 102, and/or may store the data, provided by the host 102, into the memory device 150.

The controller 130 may include a host interface (I/F) unit 132, a processor 134, an error correction code (ECC) unit 138, a power management unit (PMU) 140, a memory device controller such as a memory interface (I/F) unit 142 and a memory 144 all operatively coupled via an internal bus.

The host interface unit 132 may process commands and data provided from the host 102, and may communicate with the host 102 through at least one of various interface protocols such as universal serial bus (USB), multimedia card (MMC), peripheral component interconnect-express (PCI-E), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE).

The ECC unit 138 may detect and correct errors in the data read from the memory device 150 during the read operation. When the number of the error bits is greater than or equal to a threshold number of correctable error bits, the ECC unit 138 may not correct error bits but may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all or some of circuits, modules, systems or devices for performing the error correction operation based on at least one of the above described codes.

The PMU 140 may provide and manage power of the controller 130.

The memory interface 142 may serve as an interface for handling commands and data transferred between the controller 130 and the memory device 150, so as to allow the controller 130 to control the memory device 150 in response to a request delivered from the host 102. The memory interface 142 may generate a control signal for the memory device 150 and may process data entered into or outputted from the memory device 150 under the control of the processor 134, in a case when the memory device 150 is a flash memory and, in particular, when the memory device 150 is a NAND flash memory.

The memory 144 may serve as a working memory of the memory system 110 and the controller 130, and may store temporary or transactional data for operating or driving the memory system 110 and the controller 130. The controller 130 may control the memory device 150 in response to a request from the host 102. The controller 130 may deliver data read from the memory device 150 into the host 102, may store data entered through the host 102 within the memory device 150. The memory 144 may be used to store data required for the controller 130 and the memory device 150 in order to perform these operations.

The memory 144 may be implemented with a volatile memory. The memory 144 may be implemented with a static random access memory (SRAM) or a dynamic random access memory (DRAM). Although FIG. 1 exemplifies the memory 144 disposed within the controller 130, the disclosure is not limited thereto. That is, the memory 144 may be located inside or outside the controller 130. For instance, the memory 144 may be embodied by an external volatile memory having a memory interface transferring data and/or signals transferred between the memory 144 and the controller 130.

The processor 134 may control the overall operations of the memory system 110. The processor 134 may drive or execute a firmware to control the overall operations of the memory system 110. The firmware may be referred to as a flash translation layer (FTL).

A FTL may perform an operation as an interface between the host 102 and the memory device 150. The host 102 may transmit requests for write and read operations to the memory device 150 through the FTL.

The FTL may manage operations of address mapping, garbage collection, wear-leveling and so forth. Particularly, the FTL may store map data. Therefore, the controller 130 may map a logical address, which is provided from the host 102, to a physical address of the memory device 150 through the map data. The memory device 150 may perform an operation like a general device because of the address mapping operation. Also, through the address mapping operation based on the map data, when the controller 130 updates data of a particular page, the controller 130 may program new data on another empty page and may invalidate old data of the particular page due to a characteristic of a flash memory device. Further, the controller 130 may store map data of the new data into the FTL.

The processor 134 may be implemented with a microprocessor or a central processing unit (CPU). The memory system 110 may include one or more processors 134.

A management unit (not shown) may be included in the processor 134. The management unit may perform bad block management of the memory device 150. The management unit may find bad memory blocks included in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 100, and thus reliable bad block management is required.

Figure 2:
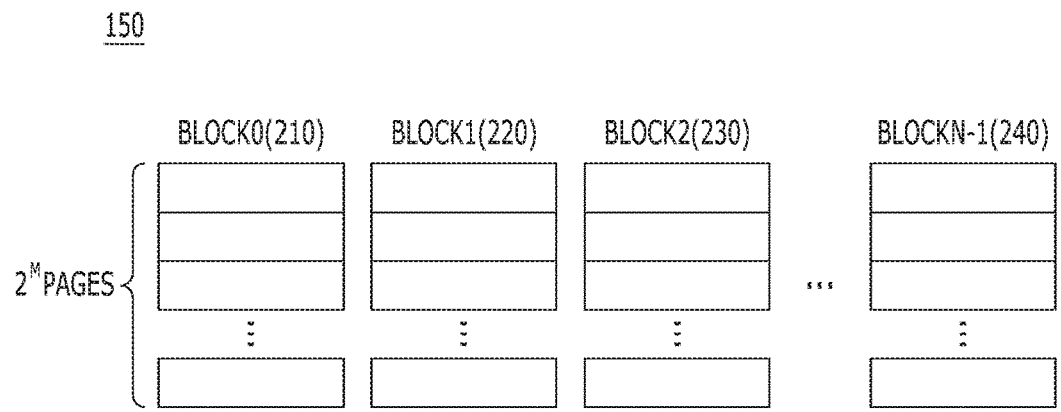
FIG. 2 is a schematic diagram illustrating an exemplary configuration of a memory device of the memory system shown in FIG. 1.

FIG. 2 is a schematic diagram illustrating the memory device 150.

Referring to FIG. 2, the memory device 150 may include the plurality of memory blocks BLOCK 0 to BLOCKN−1, and each of the blocks BLOCK 0 to BLOCKN−1 may include a plurality of pages, for example, $2^M$ pages, the number of which may vary according to circuit design. The memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Figure 3:
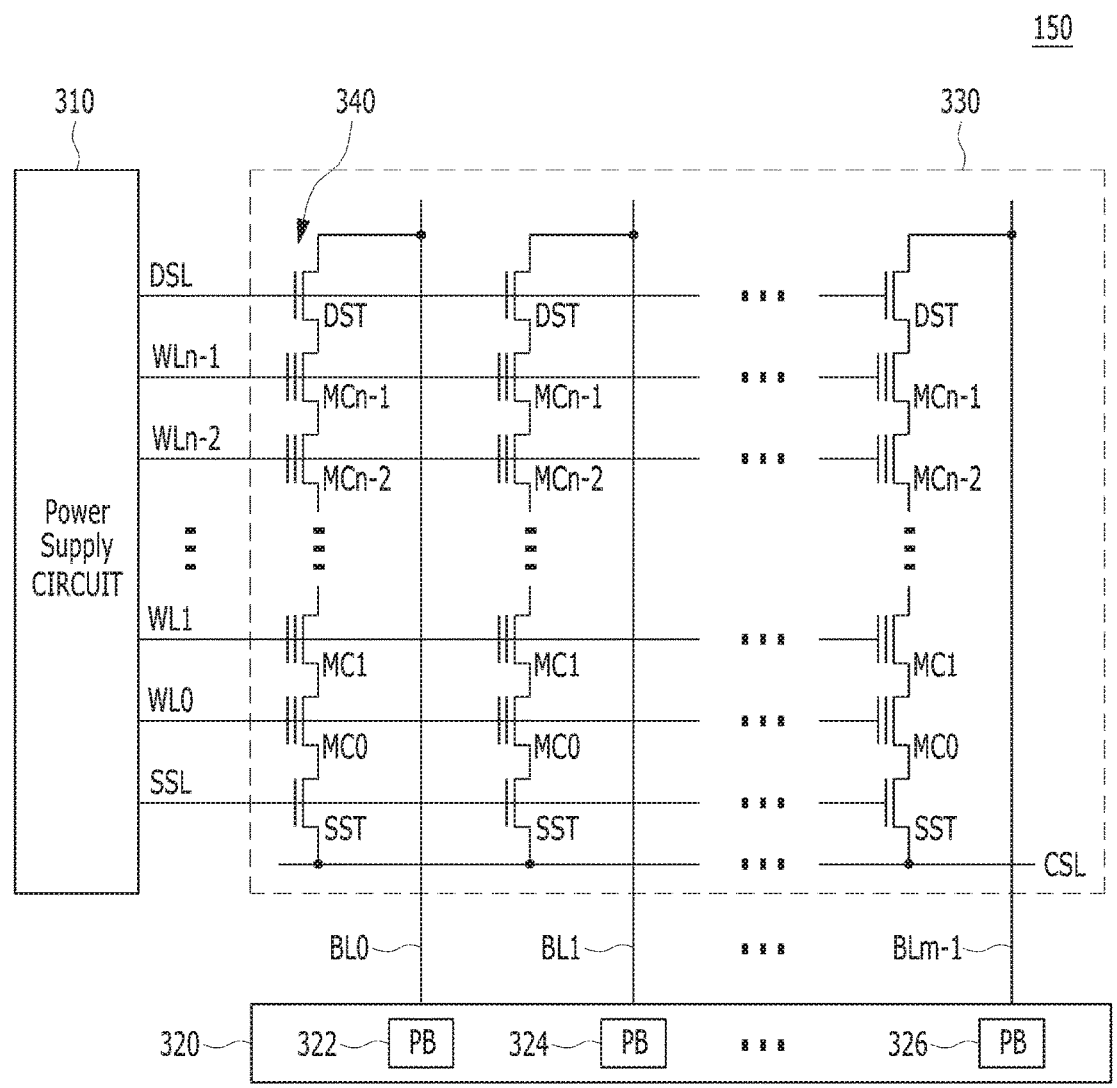
FIG. 3 is a circuit diagram illustrating an exemplary configuration of a memory cell array of a memory block in the memory device shown in FIG. 2.

FIG. 3 is a circuit diagram illustrating a memory block 330 in the memory device 150.

Referring to FIG. 3, the memory block 330 may correspond to any of the plurality of memory blocks 152 to 156.

Referring to FIG. 3, the memory block 330 of the memory device 150 may include a plurality of cell strings 340 which are electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured by single level cells (SLC) each of which may store 1 bit of information, or by multi-level cells (MLC) each of which may store data information of a plurality of bits. The strings 340 may be electrically coupled to the corresponding bit lines BL0 to BLm−1, respectively. For reference, in FIG. 3, 'DSCL' denotes a drain select line, 'SSC' denotes a source select line, and 'CSL' denotes a common source line.

While FIG. 3 only shows, as an example, that the memory block 330 is constituted with NAND flash memory cells, it is to be noted that the memory block 330 of the memory device 150 according to the embodiment is not limited to a NAND flash memory. The memory block 330 may be realized by a NOR flash memory, a hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A power supply circuit 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The power supply circuit 310 may perform a voltage generating operation under the control of a control circuit (not shown). The power supply circuit 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification operation or a normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
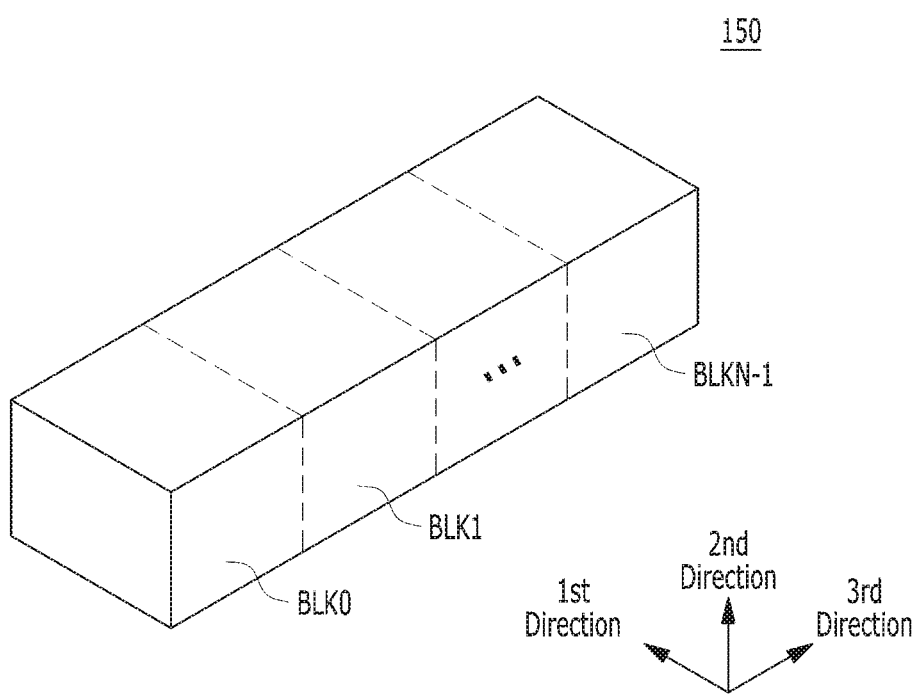
FIG. 4 is a schematic diagram illustrating an exemplary three-dimensional structure of the memory device shown in FIG. 2.

FIG. 4 is a schematic diagram illustrating a 3D structure of the memory device 150.

The memory device 150 may be embodied by a 2D or 3D memory device. Specifically, as illustrated in FIG. 4, the memory device 150 may be embodied in a nonvolatile memory device having a 3D stack structure. When the memory device 150 has a 3D structure, the memory device 150 may include a plurality of memory blocks BLK0 to BLKN−1 each having a 3D structure (or a vertical structure).

Figure 5:
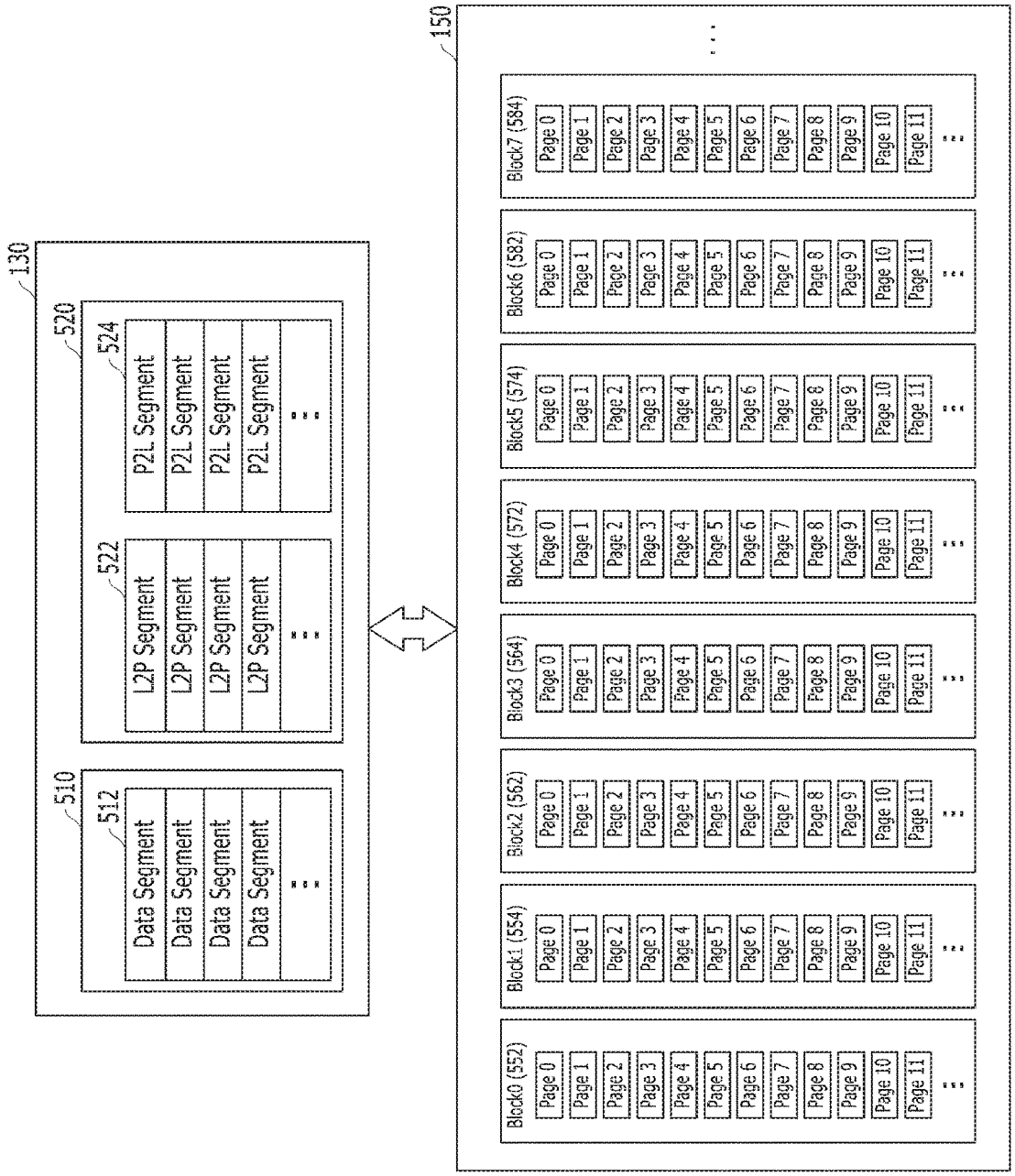
FIG. 5 is a diagram illustrating a data processing operation of a memory system in accordance with an example of the disclosure.

FIG. 5 is a diagram illustrating a data processing operation of a memory system in accordance with an embodiment of the present invention.

Referring to FIG. 5, the controller 130 may perform a command operation corresponding to a command received from the host 102. By the way of example but not limitation, the controller 130 may perform a program operation corresponding to a program command received from the host 102. Herein, the controller 130 may program and store user data corresponding to the program command within a plurality of pages included in each of memory blocks 552, 554, 562, 564, 572, 574, 582, 584 of the memory device 150.

The controller 130 may generate and update meta data for the user data, and then program and store the generated and updated meta data in the memory blocks 552, 554, 562, 564, 572, 574, 582, 584 of the memory device 150. The meta data may include both Logical to Physical (L2P) information and Physical to Logical (P2L) information for the user data stored in the memory blocks 552, 554, 562, 564, 572, 574, 582, 584. In addition, the meta data may include information on command data corresponding to a command received from the host 102, information on a command operation corresponding to the command, information on the memory blocks of the memory device 150 where the command operation is performed, and information on map data corresponding to the command operation. In other words, the meta data may include all the other information and data except user data corresponding to a command received from the host 102.

For example, the controller 130 may cache and buffer the user data corresponding to the program command received from the host 102 in a first buffer 510 included in the memory 144 of the controller 130. That is, the controller 130 may store data segments 512 of the user data in the first buffer 510, which is a data buffer/cache. Subsequently, the controller 130 may program and store the data segments 512 stored in the first buffer 510 in the pages included in the memory blocks 552, 554, 562, 564, 572, 574, 582, 584 of the memory device 150.

Since the data segments 512 of the user data are programmed and stored in the pages included in the memory blocks 552, 554, 562, 564, 572, 574, 582, 584 of the memory device 150, the controller 130 may generate L2P segments 522 and P2L segments 524, which are the meta data and store the generated L2P segments 522 and P2L segments 524 in a second buffer 520 included in the memory 144 of the controller 130. The L2P segments 522 and P2L segments 524 may be stored in a list form in the second buffer 520 included in the memory 144 of the controller 130. Subsequently, the controller 130 may program and store the L2P segments 522 and P2L segments 524 stored in the second buffer 520 in the pages included in the memory blocks 552, 554, 562, 564, 572, 574, 582, 584 of the memory device 150 through a map flush operation or a checkpoint operation.

The controller 130 may perform a command operation corresponding to a command received from the host 102. For example, the controller 130 may perform a read operation corresponding to a read command. The controller 130 may load and check out L2P segments 522 and P2L segments 524 of user data corresponding to the read command onto the second buffer 520. Subsequently, the controller 130 may read the data segments 512 of the user data from a storage location known through the check, that is, a specific page of a specific memory block among the memory blocks 552, 554, 562, 564, 572, 574, 582, 584, store the data segments 512 in the first buffer 510, and transfer the data segments 512 stored in the first buffer 510 to the host 102.

Figure 6:
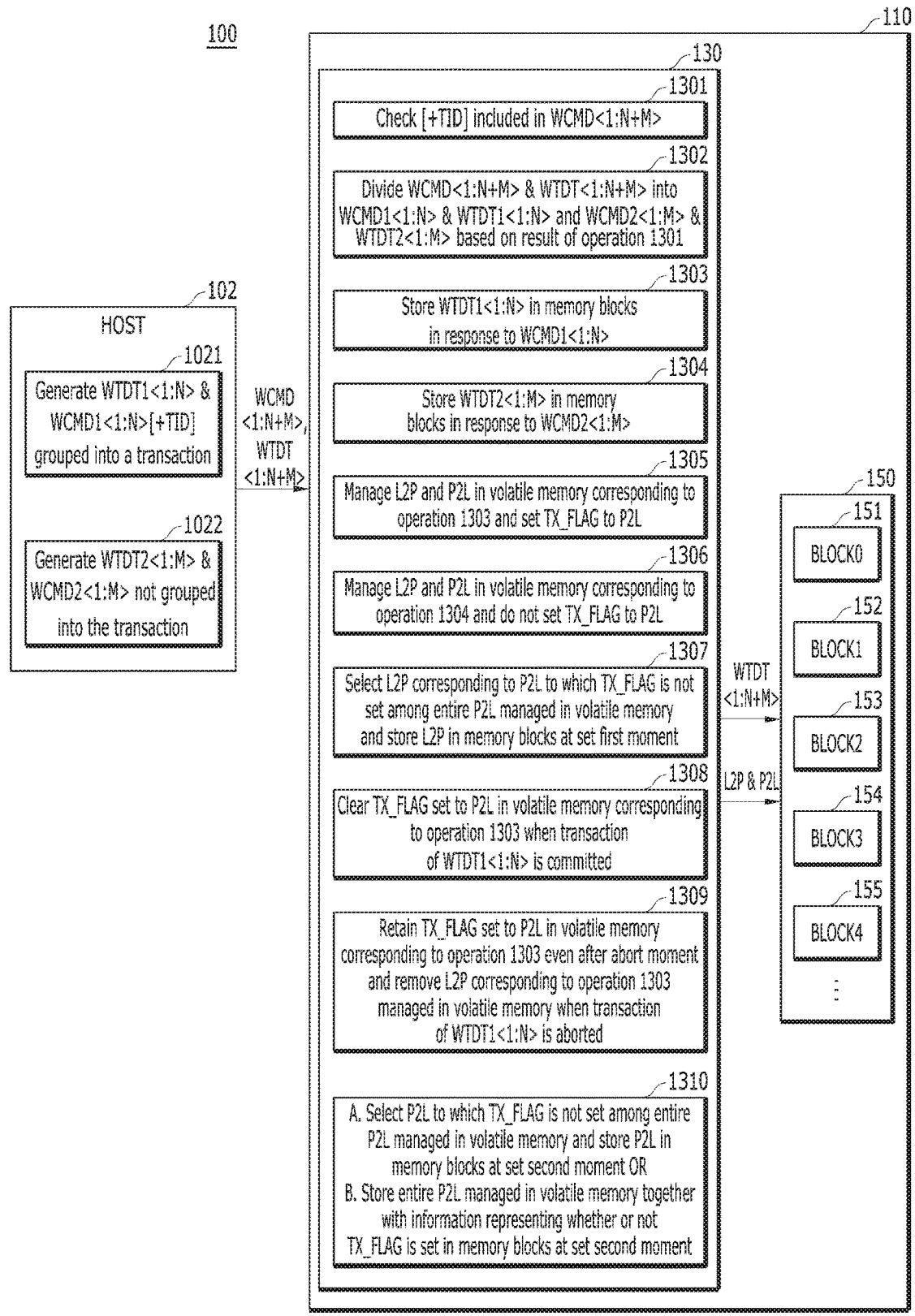
FIG. 6 is a diagram illustrating an operation of a memory system for managing mapping information corresponding to a plurality of write data grouped into a transaction in accordance with an example of the disclosure.

FIG. 6 is a diagram illustrating an operation of a memory system for managing mapping information corresponding to a plurality of write data grouped into a transaction in accordance with an embodiment of the present invention.

FIG. 6 illustrates a configuration of a data processing system 100 including a host 102 and a memory system 110 with reference to a configuration of the data processing system 100 shown in FIG. 1.

The memory system 110 may include a controller 130 and a memory device 150 as described earlier with reference to FIG. 1.

The memory device 150 may include a plurality of memory blocks 151 to 155 as described earlier with reference to FIG. 1.

For the sake of convenience in description, it is illustrated in FIG. 6 that only a single non-volatile memory device 150 is included in the memory system 110. However, a plurality of non-volatile memory devices may be included in the memory system 110, according to various embodiments.

FIG. 6 illustrates the host interface (I/F) unit 132, the processor 134, the error correction code (ECC) unit 138, the power management unit (PMU) 140, the NAND flash controller 142 and the memory 144 of FIG. 1 are not shown, for the sake of convenience in description. It should be understood that those units (or components) may be included in the controller 130.

In operation, the host 102 may generate a plurality of write data WTDT<1:N+M> and a plurality of write commands WCMD<1:N+M> for controlling an operation to store the write data WTDT<1:N+M> in the memory system 110, and transfer the generated write data WTDT<1:N+M> and write commands WCMD<1:N+M> to the memory system 110. The write data WTDT<1:N+M> may include first write data WTDT1<1:11> which are grouped into a transaction and second write data WTDT2<1:M> which are not grouped into the transaction. The write commands WCMD<1:N+M> may include first write commands WCMD1<1:N> corresponding to the first write data WTDT1<1:N> and second write commands WCMD2<1:M> corresponding to the second write data WTDT2<1:M>. The host 102 may assign a transaction ID [+TID] to the first write commands WCMD1<1:N>, thereby informing the memory system 110 that the first write data WTDT1<1:N> are grouped into the transaction. On the contrary, the host 102 may not accord transaction ID [+TID] to the second write commands WCMD2<1:M>, thereby informing the memory system 110 that the second write data WTDT2<1:M> are a general data which are not grouped into the transaction. A general data may include user data or meta data or both.

We note that an operation of the host 102 to inform the memory system 110 whether the write data WTDT<1:N+M> are grouped into the transaction (transactional data) based on the transaction ID [+TID] selectively assigned to the write commands WCMD<1:N+M> is merely described by the way of example but not limitation. It is possible that any other suitable ways may be used for notifying or recognizing whether a write data is transactional, according to a user's selection.

The memory system 110 may store the write data WTDT<1:N+M> in the memory device 150 in response to the write commands WCMD<1:N+M> received from the host 102.

Herein, since the write data WTDT<1:N+M> are grouped into the transaction, a write operation of the memory system 110 included in the data processing system 100 may be different from a write operation performed in a conventional data processing system.

Accordingly, a single transaction may group plural write data WTDT<1:N+M>, e.g., the first write data WTDT1<1:N>, which are used for the same purpose among the write data WTDT<1:N+M>.

By the way of example but not limitation, in a database including the memory system, a data newly entered to be used for plural operation purposes such as modification, addition, or update of previous data that are already stored in the database may be grouped respectively into one transaction depending on the of the operation purpose (also referred to herein as an operation type). For example, new pieces of data to be used for the purpose of modification of data that are already stored in the database may be added into a single transaction group, and new pieces of data used for the purpose of addition of data that are already stored in the database may be added into another single transaction group.

When the first write data WTDT1<1:N> grouped into the transaction are transmitted from the host 102 to the memory system 110, the first write data WTDT1<1:N> may be in a commit state in which all of the first write data WTDT1<1:N> are valid if all of the first write data WTDT1<1:N> are normally transmitted and stored. On the other hand, if any one of the first write data WTDT1<1:N> is not properly transmitted and stored, the first write data WTDT1<1:N> grouped into the transaction may be in an abort state in which all of the first write data WTDT1<1:N> are invalid. Further, the first write data WTDT1<1:N> grouped into the transaction may be considered to be in an abort state according to an abort request of the host 102. In short, the first write data WTDT1<1:N> grouped into the transaction may be treated as meaningful, i.e., valid, available or effective only when the first write data WTDT1<1:N> are checked as being in the commit state.

By the way of example but not limitation, in order for the first write data WTDT1<1:N> which are grouped into the single transaction to be checked as being in the commit state in the memory system 110, all of the N first write data WTDT1<1:N> should be normally transmitted from the host 102 to the memory system 110 and stored in the memory system 110, and at the same time, i.e., simultaneously, the host should not issue the abort request. Hence, if any one of the N first write data WTDT1<1:N> which are grouped into the single transaction is not normally transmitted and stored or if the host 102 issues the abort request before the completion of the transaction i.e., during the time in which the transaction is still being performed, then all of the first write data WTDT1<1:N> may be checked as being in the abort state in the memory system 110.

An operation of assigning the first write data WTDT1<1:N> grouped into the transaction in the commit state or in the abort state is also generally referred to herein as an operation for ensuring transaction atomicity. FIG. 6 illustrates that only the first write data WTDT1<1:N> among the write data WTDT<1:N+M> are grouped into one transaction, but this is merely an example and not a limitation of the disclosure. For example, according to various embodiments, the write data WTDT<1:N+M> may be grouped (or divided or split) into a plurality of independent transactions and, a transaction ID may be assigned to each transaction, so that each of the transactions may be distinguishable based on its transaction ID [+TID].

More specifically, the memory system 110 may include the controller 130 and the memory device 150. The memory device may include a plurality of memory blocks 151 to 155.

The controller 130 may store a plurality of write data WTDT<1:N+M> received from the host 102 in the memory blocks 151 to 155, and manage mapping information L2P and P2L corresponding to the write data WTDT<1:N+M> in a volatile memory inside. The volatile memory included in the controller 130 may be the memory 144 of the controller 130 shown in FIG. 5, not directly illustrated in FIG. 6.

The controller 130 may check whether the write data WTDT<1:N+M> are grouped into transactions, and may selectively set a transaction flag TX_FLAG to the mapping information L2P and P2L based on a check result. Subsequently, the controller 130 may selectively store the mapping information L2P and P2L in the memory blocks 151 to 155 based on whether or not the transaction flag TX_FLAG is set.

Specifically, the controller 130 may set the transaction flag TX_FLAG to the two-different mapping information L2P and P2L, which correspond to first write data WTDT1<1:N> grouped into the transaction and are managed in the volatile memory, and may not set the transaction flag TX_FLAG to the two-different mapping information L2P and P2L which correspond to second write data WTDT2<1:M> that are not gathered into the transaction and are managed in the volatile memory.

Subsequently, when the controller 130 stores the mapping information L2P and P2L, which are managed in the volatile memory, in the memory blocks 151 to 155, the controller 130 may selectively store the mapping information L2P and P2L in the memory blocks 151 to 155 based on whether the transaction flag TX_FLAG is set.

In other words, the controller 130 may not store the mapping information L2P and P2L, which correspond to the first write data WTDT1<1:N> grouped into the transaction among the mapping information L2P and P2L which are managed in the volatile memory, in the memory blocks 151 to 155 until the transaction is committed.

A reason why the controller 130 in accordance with the embodiment of the present invention operates as described above may be as follows.

Conventionally, the controller 130 used to store the entire mapping information L2P and P2L managed in the volatile memory in the memory blocks 151 to 155 at the time when a map flush operation or a checkpoint operation is performed.

However, the mapping information L2P and P2L corresponding to the first write data WTDT1<1:N> grouped into the transaction may not be stored in the memory blocks 151 to 155 before the first write data WTDT1<1:N> are committed.

This is because the first write data WIDT1<1:N> grouped into the transaction may be invalid any time before being committed, and thus a value of the mapping information L2P and P2L corresponding to the first write data WTDT1<1:N> may be also invalid. Assuming that the mapping information L2P and P2L corresponding to the first write data WTDT1<1:N> grouped into the transaction are stored in the memory blocks 151 to 155 before the transaction is committed, the transaction may be aborted after the first write data WTDT1<1:N> are stored. Thus, it may not be easy to return the mapping information L2P and P2L stored in the memory blocks 151 to 155. For this reason, the mapping information L2P and P2L corresponding to the first write data WTDT1<1:N> grouped into the transaction may not be stored in the memory blocks 151 to 155, until it is checked whether the first write data WTDT1<1:N> grouped into the transaction are committed.

Therefore, before storing the mapping information L2P and P2L which is managed in the volatile memory 144 in the memory blocks 151 to 155, a conventional controller 130 is used to check whether the mapping information L2P and P2L corresponding to the first write data WTDT1<1:N> grouped into the transaction which is not committed, are included in the mapping information L2P and P2L managed in the volatile memory. The conventional controller 130 may perform an operation of skipping the mapping information L2P and P2L, which correspond to the transaction which is not committed as a check result, stored in the memory blocks 151 to 155.

For example, the conventional controller is used to perform an operation of searching whether the mapping information L2P and P2L are included in a transaction table before storing the mapping information L2P and P2L managed in the volatile memory in the memory blocks. However, the searching whether the mapping information L2P and P2L are included in the transaction table whenever the controller performs an operation of storing the mapping information L2P and P2L in the memory blocks 151 may result in a substantially increased load for the controller. The transaction table managed in the controller may indicate a table for managing transaction information corresponding to data, which are grouped in a single transaction, such as the first write data WTDT1<1:N>. Since an operation of managing the transaction table separately from an operation of managing the mapping information L2P and P2L in the controller 130 is well known to people skilled in the art, detailed descriptions thereof will not be provided herein.

However, the controller 130 in accordance with the embodiment of the present invention, as described above, may set the transaction flag TX_FLAG to the mapping information L2P and P2L managed in the volatile memory, and then select whether to store the mapping information L2P and P2L in the memory blocks 151 to 155 based on whether the transaction flag TX_FLAG is set. Therefore, there is no need to search whether the mapping information L2P and P2L are included in the transaction table whenever the controller 130 stores the mapping information L2P and P2L in the memory blocks 151 to 155.

Meanwhile, as described above with reference to FIG. 5, the mapping information L2P and P2L may include first mapping information L2P (i.e., Logical to Physical information) and second mapping information P2L (i.e., Physical to Logical information) for the write data WTDT<1:N+M> stored in the memory blocks 151 to 155.

The first mapping information L2P and the second mapping information P2L may be managed in the volatile memory of the controller 130. At a set moment, the first mapping information L2P and second mapping information P2L managed in the volatile memory may be stored in the memory blocks 151 to 155 included in the non-volatile memory device 150. For example, the first mapping information L2P may be stored in the memory blocks 151 to 155 at a first set moment, while the second mapping information P2L may be stored in the memory blocks 151 to 155 at a second set moment. The first and second set moments may be the same moment or different moments (also referred to as time points or timings). For example, when the map flush operation is performed, the first set moment and the second set moment may be the same. When a specific memory block among the memory blocks 151 to 155 is closed, the first set moment and the second set moment may be different. The first mapping information L2P and the second mapping information P2L may be stored in the same memory block among the memory blocks 151 to 155 or in different memory blocks.

Figure 8:
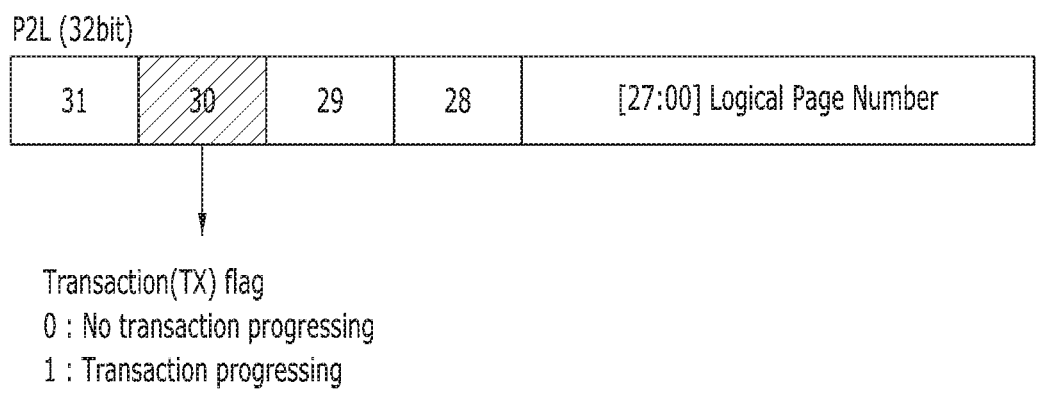
FIG. 8 is a diagram illustrating an exemplary form of mapping information corresponding to a plurality of write data grouped into a transaction in a memory system shown in FIG. 6.

As described above, the mapping information L2P and P2L may be managed as the first mapping information L2P and the second mapping information P2L. Therefore, the controller 130 in accordance with the embodiment of the present invention may check whether the write data WTDT<1:N+M> are grouped into the transaction, selectively set the transaction flag TX_FLAG to the second mapping information P2L based on a check result, and then selectively store the first mapping information L2P corresponding to the second mapping information P2L in the memory blocks 151 to 155 based on whether the transaction flag TX_FLAG is set to the second mapping information P2L. The second mapping information P2L, arranged sequentially based on physical information, may store each logical information corresponding to each physical information. The second mapping information P2L may contain empty bits where any logical information corresponding to any physical information is not stored. The controller 130 may selectively set the transaction flag TX_FLAG through the empty bits. By the way of example but not limitation, it may be seen in FIG. 8 that the logical information is stored in 28 bits [27:00] of the second mapping information P2L including total 32 bits and the transaction flag TX_FLAG is set to the bit 30 among the remaining bits 28, 29, 30, 31. In other words, it may be assumed that when the 30$^{th}$ bit of the second mapping information P2L has a value of '0', the transaction flag TX_FLAG is not set, while the transaction flag TX_FLAG is set when the 30$^{th}$ bit of the second mapping information P2L has a value of '1.' The method of setting the transaction flag TX_FLAG to the second mapping information P2L may be merely an example of the disclosure, and the transaction flag TX_FLAG may be set in other methods depending on design requirement or types of devices.

Specifically, based on a result of checking whether the write data WTDT<1:N+M> are grouped into the transaction whenever the write data WTDT<1:N+M> are stored in the memory blocks 151 to 155, the controller 130 may split the write data WTDT<1:N+M>, delivered or received from the host 102, into two group data: the first write data WTDT1<1:N>, which are grouped into the transaction, and the second write data WTDT2<1:M> which are not grouped into the transaction.

In step 1301, the controller 130 may check the transaction ID [+TID] included in the write commands WCMD<1:N+M> corresponding to the write data WTDT<1:N+M> received from the host 102. For example, the transaction ID [+TID] with a specific value may be set to the first write commands WCMD1<1:N> corresponding to the first write data WTDT1<1:N> grouped into the transaction among the write data WTDT<1:N+M>. The transaction ID [+TID] may not be set to the second write commands WCMD2<1:M> corresponding to the second write data WTDT2<1:M> grouped into the transaction among the write data WTDT<1:N+M>.

Accordingly, in step 1302, the controller 130 may divide the write commands WCMD<1:N+M> and the write data WTDT<1:N+M> into two groups: i.e., first group including the first write commands WCMD1<1:N> and first write data WTDT1<1:N>, which are grouped into the transaction, and a second group including the second write commands WCMD2<1:M> and second write data WTDT2<1:M> which are not grouped into the transaction, respectively, based on a result of the operation shown in step 1301.

In step 1303, the controller 130 may store the first write data WTDT1<1:N> in the memory blocks 151 to 155 in response to the first write commands WCMD1<1:N>.

In step 1305, the controller 130 may generate the first mapping information L2P and the second mapping information P2L which correspond to the first write data WTDT1<1:N> and manage them in the volatile memory based on a result of the operation shown in step 1303 and set the transaction flag TX_FLAG to the second mapping information P2L corresponding to the first write data WTDT1<1:N>.

Similarly, in step 1304, the controller 130 may store the second write data WTDT2<1:M> in the memory blocks 151 to 155 in response to the second write commands WCMD2<1:M>.

In step 1306, the controller may generate the first mapping information L2P and the second mapping information P2L which correspond to the second write data WIDT2<1:M> and may manage them in the volatile memory based on a result of the operation shown in step 1304. The controller may not set the transaction flag TX_FLAG to the second mapping information P2L corresponding to the second write data WIDT2<1:M>.

Subsequently, the controller 130 may select just the first mapping information L2P, corresponding to the second mapping information P2L to which the transaction flag TX_FLAG is not set, among the entire second mapping information P2L managed in the volatile memory at the first set moment. The controller 130 may store the selected first mapping information L2P in the memory blocks 151 to 155.

On the contrary, the controller 130 may skip the first mapping information L2P, corresponding to the second mapping information P2L to which the transaction flag TX_FLAG is set, among the entire second mapping information P2L managed in the volatile memory at the first set moment to be stored in the memory blocks 151 to 155.

That is, the controller 130 may not store unconditionally the entire first mapping information L2P managed in the volatile memory in the memory blocks 151 to 155 at the first set moment. In step 1307, the controller 130 may check whether the transaction flag TX_FLAG is set to the entire second mapping information P2L managed in the volatile memory at the first set moment. The controller 130 may select just the first mapping information L2P, corresponding to the second mapping information P2L to which the transaction flag TX_FLAG is not set as a check result. The controller 130 may store the selected first mapping information L2P in the memory blocks 151 to 155.

In other words, the controller 130 may check whether the transaction flag TX_FLAG is set to the entire second mapping information P2L managed in the volatile memory at the first set moment and may skip the first mapping information L2P corresponding to the second mapping information P2L to which the transaction flag TX_FLAG is set as a check result to be stored in the memory blocks 151 to 155. Therefore, the controller 130 may not store the first mapping information L2P, corresponding to the second mapping information P2L to which the transaction flag TX_FLAG is set in the memory blocks 151 to 155 at the first set moment, but may continue to manage the first mapping information L2P in the volatile memory.

In step 1310, the controller 130 may select and carry out any one of two methods, which are to be described below, to store the second mapping information P2L managed in the volatile memory in the memory blocks 151 to 155 at the second set moment.

A first method is that the controller 130 may select just the second mapping information P2L to which the transaction flag TX_FLAG is not set among the entire second mapping information P2L managed in the volatile memory and store the selected second mapping information P2L in the memory blocks 151 to 155 at the second set moment in step A of 1310.

In the first method, the controller 130 may not store unconditionally the entire second mapping information P2L managed in the volatile memory in the memory blocks 151 to 155 at the second set moment. The controller 130 may check whether the transaction flag TX_FLAG is set to the entire second mapping information P2L managed in the volatile memory at the second set moment, select the second mapping information P2L to which the transaction flag TX_FLAG is not set as a check result, and store the selected second mapping information P2L in the memory blocks 151 to 155.

That is, the controller 130 may check whether or not the transaction flag TX_FLAG is set to the entire second mapping information P2L managed in the volatile memory at the second set moment, and may skip the second mapping information P2L to which the transaction flag TX_FLAG is set as a check result to be stored in the memory blocks 151 to 155. Accordingly, the controller 130 may not store the second mapping information P2L to which the transaction flag TX_FLAG is set in the memory blocks 151 to 155 at the second set moment but may continue to manage the second mapping information P2L in the volatile memory.

A second method is that the controller 130 may store the entire second mapping information P2L managed in the volatile memory together with information representing whether the transaction flag TX_FLAG is set in the memory blocks 151 to 155 at the second set moment in step B of 1310.

In the second method, the controller 130 may store the entire second mapping information P2L managed in the volatile memory in the memory blocks 151 to 155 at the second set moment. In addition, the controller 130 may store the information representing whether the transaction flag TX_FLAG is set to the entire second mapping information P2L managed in the volatile memory in the memory blocks 151 to 155.

Accordingly, in the second method, the controller 130 may not need to perform an operation to check whether the transaction flag TX_FLAG is set when storing the second mapping information P2L managed in the volatile memory. Instead, when loading the second mapping information P2L stored in the memory blocks 151 to 155 onto the volatile memory, the controller 130 may check whether the transaction flag TX_FLAG is set, select just the second mapping information P2L to which the transaction flag TX_FLAG is not set, and load the selected second mapping information P2L onto the volatile memory.

When the transaction corresponding to the first write data WTDT1<1:N> is committed, the controller 130 may clear the transaction flag TX_FLAG, which is set to the second mapping information P2L corresponding to the first write data WTDT1<1:N>, into a state of being unset prior to a commit moment of the transaction in step 1308.

The fact that the transaction corresponding to the first write data WTDT1<1:N> is committed may mean that the first mapping information L2P and second mapping information P2L corresponding to the first write data WTDT1<1:N> are allowed to be stored in the memory blocks 151 to 155. Also, the controller 130 may set the transaction flag TX_FLAG to the second mapping information P2L corresponding to the first write data WTDT1<1:N> prior to the commit moment of the transaction.

After the transaction corresponding to the first write data WTDT1<1:N> is committed, the controller 130 may clear the transaction flag TX_FLAG, which is set to the second mapping information P2L corresponding to the first write data WTDT1<1:N>, into the state of being unset so that the first mapping information L2P corresponding to the first write data WTDT1<1:N> may be stored in the memory blocks 151 to 155 at the first set moment.

When the transaction corresponding to the first write data WTDT1<1:N> is aborted, the controller 130 may retain the transaction flag TX_FLAG, which is set to the second mapping information P2L corresponding to the first write data WTDT1<1:N> prior to an abort moment of the transaction, even after the abort moment of the transaction and remove the first mapping information L2P corresponding to the first write data WTDT1<1:N> from the volatile memory in step 1309.

The fact that the transaction corresponding to the first write data WTDT1<1:N> is aborted may be considered that the first mapping information L2P and second mapping information P2L corresponding to the first write data WTDT1<1:N> are not allowed to be stored in the memory blocks 151 to 155. Also, the controller 130 may set the transaction flag TX_FLAG to the second mapping information P2L corresponding to the first write data WTDT1<1:N> prior to the abort moment of the transaction.

After the transaction corresponding to the first write data WTDT1<1:N> is aborted, the controller 130 may retain the transaction flag TX_FLAG, which is set to the second mapping information P2L corresponding to the first write data WTDT1<1:N>, even after the abort moment of the transaction so that the first mapping information L2P corresponding to the first write data WTDT1<1:N> may not be stored in the memory blocks 151 to 155 even at the first set moment.

Also, after the transaction corresponding to the first write data WTDT1<1:N> is aborted, the first mapping information L2P and second mapping information P2L corresponding to the first write data WTDT1<1:N> may not need to be managed in the volatile memory any longer. Accordingly, the controller 130 may remove the first mapping information L2P and second mapping information P2L corresponding to the first write data WTDT1<1:N> after the transaction corresponding to the first write data WTDT1<1:N> is aborted. After the transaction corresponding to the first write data WTDT1<1:N> is aborted, the controller 130 performs an operation to remove the first mapping information L2P and second mapping information P2L corresponding to the first write data WIDT1<1:N> from the volatile memory. However, controller's remove operation may not be determined in advance and may be adjusted according to the design requirement.

FIGS. 7A and 7B are diagrams illustrating an example of an operation of a memory system for managing mapping information corresponding to a plurality of write data grouped into a transaction as shown in FIG. 6.

FIG. 7A illustrates a case where the transaction is committed in the operation of the memory system 110 to manage the mapping information corresponding to a plurality of write data write data WTDT<1:N+M> grouped into the transaction as shown in FIG. 6.

For illustrative purposes, it is assumed that at moment A shown in FIG. 7A six write data WIDT<1:6> are transmitted from the host 102 to the memory system 110. The controller 130 of the memory system 110 may store the write data WTDT<1:6> in the memory blocks 151 to 155 of the non-volatile memory device 150, generate the first mapping information L2P and the second mapping information P2L corresponding to an operation of storing the write data WTDT<1:6>, and manage the first mapping information L2P and the second mapping information P2L as tables 704 and 702.

Specifically, it may be assumed that a first write data WTDT<1> is not grouped into the transaction and stored in a physical zone corresponding to a logical address LBA of a value of '100' and a physical address PBA of a value of '0'. Accordingly, the second mapping information P2L corresponding to the first write data WTDT<1> may include information for mapping the logical address LBA of the value of '100' with the physical address PBA of the value of '0.' Also, its transaction flag TX_FLAG may not be set and may have the value of '0'. Likewise, the first mapping information L2P corresponding to the first write data WTDT<1> may include information for mapping the physical address PBA of the value of '0' with the logical address LBA of the value of '100'.

It may be assumed that a second write data WTDT<2> is not grouped into the transaction and stored in a physical zone corresponding to a logical address LBA of a value of '104' and a physical address PBA of a value of '1'. Accordingly, the second mapping information P2L corresponding to the second write data WTDT<2> may include information for mapping the logical address LBA of the value of '104' with the physical address PBA of the value of '1', and its transaction flag TX_FLAG is not set and has the value of '0.' The first mapping information L2P corresponding to the second write data WTDT<2> may be in a state where the physical address PBA of the value of '1' is mapped in the logical address LBA of the value of '104'.

It may be assumed that a third write data WTDT<3> is grouped into the transaction and stored in a physical zone corresponding to a logical address LBA of a value of '400' and a physical address PBA of a value of '2'. Accordingly, the second mapping information P2L corresponding to the third write data WTDT<3> may be in a state where the logical address LBA of the value of '400' is mapped in the physical address PBA of the value of '2' and the transaction flag TX_FLAG of the value of '1' is included and so the transaction flag TX_FLAG is set. The first mapping information L2P corresponding to the third write data WTDT<3> may be in a state where the physical address PBA of the value of '2' is mapped in the logical address LBA of the value of '400'.

It may be assumed that a fourth write data WTDT<4> is not grouped into the transaction and stored in a physical zone corresponding to a logical address LBA of a value of '601' and a physical address PBA of a value of '3'. Accordingly, the second mapping information P2L corresponding to the fourth write data WTDT<4> may be in a state where the logical address LBA of the value of '601' is mapped in the physical address PBA of the value of '3' and the transaction flag TX_FLAG of the value of '0' is included and so the transaction flag TX_FLAG is not set. The first mapping information L2P corresponding to the fourth write data WTDT<4> may be in a state where the physical address PBA of the value of '3' is mapped in the logical address LBA of the value of '601'.

It may be assumed that a fifth write data WTDT<5> is grouped into the transaction and stored in a physical zone corresponding to a logical address LBA of a value of '404' and a physical address PBA of a value of '4'. Accordingly, the second mapping information P2L corresponding to the fifth write data WTDT<5> may be in a state where the logical address LBA of the value of '404' is mapped in the physical address PBA of the value of '4' and the transaction flag TX_FLAG of the value of '1' is included and so the transaction flag TX_FLAG is set. The first mapping information L2P corresponding to the fifth write data WTDT<5> may be in a state where the physical address PBA of the value of '4' is mapped in the logical address LBA of the value of '404'.

It may be assumed that a sixth write data WTDT<6> is grouped into the transaction and stored in a physical zone corresponding to a logical address LBA of a value of '408' and a physical address PBA of a value of '5'. Accordingly, the second mapping information P2L corresponding to the sixth write data WTDT<6> may be in a state where the logical address LBA of the value of '408' is mapped in the physical address PBA of the value of '5' and the transaction flag TX_FLAG of the value of '1' is included and so the transaction flag TX_FLAG is set. The first mapping information L2P corresponding to the fifth write data WTDT<5> may be in a state where the physical address PBA of the value of '5' is mapped in the logical address LBA of the value of '408'.

To sum up, the third write data WTDT<3>, the fifth write data WTDT<5> and the sixth write data WTDT<6> may be three first write data WTDT1<1:3> grouped into the transaction. Therefore, the second mapping information P2L corresponding to the first write data WTDT1<1:3> may be in a state where the transaction flag TX_FLAG of the value of '1' is included and so the transaction flag TX_FLAG is set. The first write data WTDT<1>, the second write data WTDT<2> and the fourth write data WTDT<4> may be three second write data WTDT2<1:3> which are not grouped into the transaction. Therefore, the second mapping information P2L corresponding to the second write data WTDT2<1:3> may be in a state where the transaction flag TX_FLAG of the value of '0' is included and so the transaction flag TX_FLAG is not set.

In this state, when all the first mapping information L2P included in the first mapping information table 704 are stored in the memory blocks 151 to 155 at the first set moment, the controller 130 may check whether the transaction flag TX_FLAG is set to all the second mapping information P2L included in the second mapping information table 702, select just the first mapping information L2P corresponding to the second mapping information P2L to which the transaction flag TX_FLAG is not set based on a check result, and store the selected first mapping information L2P in the memory blocks 151 to 155 (Program). The controller 130 may not store the first mapping information L2P corresponding to the second mapping information P2L to which the transaction flag TX_FLAG is set based on the check result in the memory blocks 151 to 155 (Skip Program).

Specifically, the controller 130 may check that the second mapping information P2L where the physical address PBA of the value of '0' and the logical address LBA of the value of '100' are mapped, the second mapping information P2L where the physical address PBA of the value of '1' and the physical address PBA of the value of '104' are mapped, and the second mapping information P2L where the physical address PBA of the value of '3' and the logical address LBA of the value of '601' are mapped, which correspond to the second write data WTDT2<1:3>, are in a state where the transaction flag TX_FLAG of the value of '0' is included and so the transaction flag TX_FLAG is not set. Therefore, the controller 130 may store the first mapping information L2P where the logical address LBA of the value of '100' is mapped in the physical address PBA of the value of '0', the first mapping information L2P where the physical address PBA of the value of '104' and the physical address PBA of the value of '1' are mapped, and the first mapping information L2P where the logical address LBA of the value of '601' and the physical address PBA of the value of '3' are mapped, which correspond to the second write data WTDT2<1:3>, in the memory blocks 151 to 155 at the first set moment (Program).

Also, the controller 130 may check that, in the second mapping information P2L, first information for mapping the physical address PBA of the value of '2' with the logical address LBA of the value of '400', second information P2L for mapping the physical address PBA of the value of '4' with the logical address LBA of the value of '404', and third information for mapping the physical address PBA of the value of '5' with the logical address LBA of the value of '408', corresponding to the first write data WTDT1<1:3>, are in a state where the transaction flag TX_FLAG of the value of '1' is included and the transaction flag TX_FLAG is set. Therefore, the controller 130 may not store, in the first mapping information L2P, first information for mapping the logical address LBA of the value of '400' with the physical address PBA of the value of '2', second information for mapping the logical address LBA of the value of '404' with the physical address PBA of the value of '4', and third information for mapping the logical address LBA of the value of '408' with the physical address PBA of the value of '5' are mapped, which correspond to the first write data WTDT1<1:3>, in the memory blocks 151 to 155 at the first set moment (Skip Program).

A moment B shown in FIG. 7A may be assumed as a timing when two write data WTDT<7:8> are further transmitted from the host 102 to the memory system 110 after the moment A. The controller 130 of the memory system 110 may store the write data WTDT<7:8> in the memory blocks 151 to 155 of the non-volatile memory device 150, generate the first mapping information L2P and the second mapping information P2L corresponding to an operation of storing the write data WTDT<7:8>, and manage the first mapping information L2P and the second mapping information P2L as tables 702 and 704.

At moment B, it is assumed that write data WTDT<7:8> are transmitted from the host 102 to the memory system 110, and the transaction is committed. That is, at moment B, it may be assumed that an eighth write data WTDT<8> is transmitted from the host 102 to the memory system 110 to become the fourth first write data WTDT1<1:4>, and the transaction is committed.

The first mapping information L2P and the second mapping information P2L may be generated and managed as the tables 702 and 704 in the same manner as described above for the write data WTDT<1:6> received at moment A.

It may be assumed that a seventh write data WTDT<7> is not grouped into the transaction and stored in a physical zone corresponding to a logical address LBA of a value of '800' and a physical address PBA of a value of '6'. Accordingly, the second mapping information P2L corresponding to the seventh write data WTDT<7> may include information for mapping the logical address LBA of the value of '800' with the physical address PBA of the value of '6'. Since the transaction flag TX_FLAG has the value of '0,' the transaction flag TX_FLAG is not set. The first mapping information L2P corresponding to the seventh write data WTDT<7> is for mapping the physical address PBA of the value of '6' with the logical address LBA of the value of '800'.

It may be assumed that an eighth write data WTDT<8> is grouped into the transaction and stored in a physical zone corresponding to a logical address LBA of a value of '808' and a physical address PBA of a value of '7'. Accordingly, the second mapping information P2L corresponding to the eighth write data WTDT<8> may be in a state for where the logical address LBA of the value of '808' is mapped in the physical address PBA of the value of '7' and the transaction flag TX_FLAG of the value of '1' is included, meaning that the transaction flag TX_FLAG is set. The first mapping information L2P corresponding to the eighth write data WTDT<8> may be for mapping the physical address PBA of the value of '7' with the logical address LBA of the value of '808'.

In this state, when the transaction is committed after the eighth write data WTDT<8> is transmitted and assigned as four first write data WTDT1<1:4>, the controller 130 may clear or initialize a value of the transaction flag TX_FLAG regarding the second mapping information P2L corresponding to the first write data WTDT1<1:4> stored in the second mapping information P2L from the value of '1' to the value of '0', thereby changing a state where the transaction flag TX_FLAG is set with the other state where the transaction flag TX_FLAG is not set. Therefore, the eight second mapping information P2L included in the second mapping information table 702 may include the transaction flag TX_FLAG of the value of '0'.

In this state, when all the first mapping information L2P included in the first mapping information table 704 are stored in the memory blocks 151 to 155 at the first set moment, the controller 130 may check whether the transaction flag TX_FLAG is set to all the second mapping information P2L included in the second mapping information table 702, select just the first mapping information L2P corresponding to the second mapping information P2L to which the transaction flag TX_FLAG is not set based on a check result, and store the selected first mapping information L2P in the memory blocks 151 to 155 (Program). However, the controller 130 may not store the first mapping information L2P corresponding to the second mapping information P2L to which the transaction flag TX_FLAG is set based on the check result in the memory blocks 151 to 155 (Skip Program).

Since the transaction is committed and the eight second mapping information P2L included in the second mapping information table 702 includes the transaction flag TX_FLAG of the value of '0' at the moment B, the controller 130 may check the second mapping information table 702, and then store the eighth first mapping information L2P included in the first mapping information table 704 in the memory blocks 151 to 155 at the first set moment as a check result (Program).

FIG. 7B illustrates a case where the transaction is aborted in the operation of the memory system 110 to manage the mapping information corresponding to a plurality of write data write data WTDT<1:N+M> grouped into the transaction as shown in FIG. 6.

It may be seen that a moment C shown in FIG. 7B is completely the same as the moment A shown in FIG. 7A. Therefore, descriptions on the moment C of FIG. 7B will be omitted.

A moment D shown in FIG. 7B may be assumed as a timing when two write data WTDT<7:8> are further transmitted from the host 102 to the memory system 110 after the moment C, and the controller 130 of the memory system 110 stores the write data WTDT<7:8> in the memory blocks 151 to 155 of the non-volatile memory device 150, generates the first mapping information L2P and the second mapping information P2L corresponding to an operation of storing the write data WTDT<7:8> and manages the first mapping information L2P and the second mapping information P2L as tables 702 and 704.

At the moment D, that the transaction is aborted in a case after the write data WTDT<7:8> are transmitted from the host 102 to the memory system 110 may be assumed. That is, at the moment D, it may be assumed that an eighth write data WTDT<8> is transmitted from the host 102 to the memory system 110 to become the fourth first write data WTDT1<1:4>, and then the transaction is aborted.

The eight write data WTDT<1:8> may be transmitted and stored in the second mapping information table 702 in the same manner as described at the moment B of FIG. 7A, and then the first mapping information L2P and the second mapping information P2L may be generated and managed in the tables 702 and 704.

In this state, when the eighth write data WTDT<8> is transmitted to become four first write data WTDT1<1:4> and the transaction is aborted, the controller 130 may maintain that the transaction flag TX_FLAG of the second mapping information P2L, corresponding to the first write data WTDT1<1:4> stored in the second mapping information P2L, has the value of '1' so that a state where the transaction flag TX_FLAG is set is kept. Therefore, the transaction flag TX_FLAG of the second mapping information P2L, corresponding to the first write data WTDT1<1:4> included in the second mapping information table 702, may continuously have the value of '1'.

In this state, when all the first mapping information L2P included in the first mapping information table 704 are stored in the memory blocks 151 to 155 at the first set moment, the controller 130 may check whether the transaction flag TX_FLAG is set or established to all the second mapping information P2L included in the second mapping information table 702, select just the first mapping information L2P corresponding to the second mapping information P2L to which the transaction flag TX_FLAG is not set based on a check result, and store the selected first mapping information L2P in the memory blocks 151 to 155 (Program). However, the controller 130 may not store the first mapping information L2P corresponding to the second mapping information P2L to which the transaction flag TX_FLAG is set based on the check result in the memory blocks 151 to 155 (Skip Program).

Specifically, the controller 130 may check that, in the second mapping information P2L, first information for mapping the physical address PBA of the value of '0' with the logical address LBA of the value of '100', second information for mapping the physical address PBA of the value of '1' with the logical address LBA of the value of '104', third information for mapping the physical address PBA of the value of '3' with the logical address LBA of the value of '601', and fourth information for mapping the physical address PBA of the value of '6' with the logical address LBA of the value of '800', which correspond to the second write data WTDT2<1:4>, are in a state where transaction flags TX_FLAG are not set and have the value of '0.' Therefore, the controller 130 may store, in the first mapping information L2P, first information for mapping the logical address LBA of the value of '100' with the physical address PBA of the value of '0', second information for mapping the logical address LBA of the value of '104' with the physical address PBA of the value of '1' are mapped, third information for mapping the logical address LBA of the value of '601' with the physical address PBA of the value of '3', and fourth information for mapping the logical address LBA of the value of '800' with the physical address PBA of the value of '6', which correspond to the second write data WTDT2<1:4>, in the memory blocks 151 to 155 at the first set moment (Program).

Also, the controller 130 may check that, in the second mapping information P2L, first information for mapping the physical address PBA of the value of '2' with the logical address LBA of the value of '400', second information for mapping the physical address PBA of the value of '4' with the logical address LBA of the value of '404', third information for mapping the physical address PBA of the value of '5' with the logical address LBA of the value of '408', and fourth information for mapping the physical address PBA of the value of '7' with the logical address LBA of the value of '808', which correspond to the first write data WTDT1<1:4>, are in a state where its transaction flag TX_FLAG is set because the transaction flag TX_FLAG has the value of '1'. Therefore, the controller 130 may not store the first mapping information L2P where the logical address LBA of the value of '400' is mapped in the physical address PBA of the value of '2', the first mapping information L2P where the logical address LBA of the value of '404' and the physical address PBA of the value of '4' are mapped, the first mapping information L2P where the logical address LBA of the value of '408' and the physical address PBA of the value of '5' are mapped, and the first mapping information L2P where the logical address LBA of the value of '808' and the physical address PBA of the value of '7' are mapped, which correspond to the first write data WTDT1<1:4>, in the memory blocks 151 to 155 at the first set moment (Skip Program).

Since the transaction corresponding to the first write data WTDT1<1:4> is aborted, the controller 130 may select and remove the four first mapping information L2P corresponding to the first write data WTDT1<1:4> from the first mapping information table 704 (Remove). Although not illustrated directly in the drawing, since the transaction corresponding to the first write data WTDT1<1:4> is aborted, the controller 130 may select and remove the four second mapping information P2L corresponding to the first write data WTDT1<1:4> from the second mapping information table 702, and may store information representing whether or not the transaction flag TX_FLAG is set or established in the memory blocks 151 to 155. A time when the four first mapping information L2P and second mapping information P2L which correspond to the first write data WTDT1<1:4> are removed from the first mapping information table 704 and the second mapping information table 702 may not be defined in advance and may be adjusted according to the design requirement.

Figure 9:
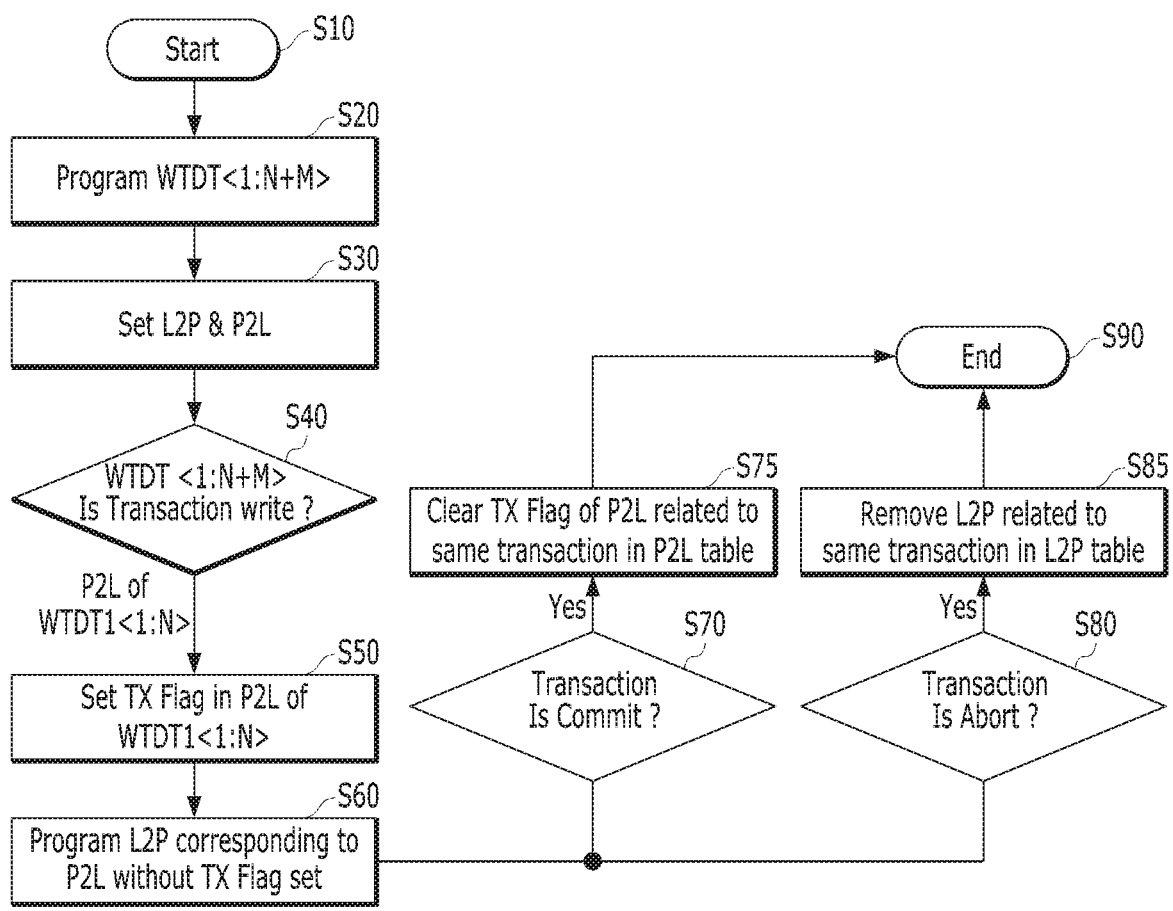
FIG. 9 is a flow chart illustrating an operation of a memory system for managing mapping information corresponding to a plurality of write data grouped into a transaction.

FIG. 9 is a flow chart illustrating an operation of a memory system for managing mapping information corresponding to a plurality of write data grouped into a transaction as shown in FIG. 6.

Referring to FIG. 9, an operation of the memory system 110 may start while a plurality of write data WTDT<1:N+M> are transmitted from the host 102 in step S10.

In step S20, the memory system 110 may store the write data WTDT<1:N+M> transmitted from the host 102 in the memory blocks 151 to 155.

In step S30, the memory system 110 may generate the first mapping information L2P and the second mapping information P2L corresponding to an operation of the step S20.

When the first mapping information L2P and the second mapping information P2L are generated through an operation of the step S30, it may be checked which of the first mapping information L2P and the second mapping information P2L correspond to the first write data WTDT1<1:N>, which are grouped into the transaction among the write data WTDT<1:N+M> or the second write data WTDT2<1:M> which are not grouped into the transaction among the write data WTDT<1:N+M> in step S40.

As a check result of the step S40, the second mapping information P2L corresponding to the first write data WIDT1<1:N> may be selected, and the transaction flag TX_FLAG may be set in step S50. Accordingly, as the check result of the step S40, the transaction flag TX_FLAG may not be set to the second mapping information P2L corresponding to the second write data WTDT2<1:M>.

Subsequently, at the first set moment, only the first mapping information L2P corresponding to the second mapping information P2L for which the transaction flag TX_FLAG is not set among the entire second mapping information P2L managed in the volatile memory 144 may be selected and stored in the memory blocks 151 to 155 in step S60. Accordingly, the first mapping information L2P corresponding to the second mapping information P2L for which the transaction flag TX_FLAG is set among the entire second mapping information P2L managed in the volatile memory 144 may not be stored in the memory blocks 151 to 155 and may continue to be managed in the volatile memory 144.

Subsequently, when the transaction is committed in step S70 ("YES"), the transaction flag TX_FLAG included in the second mapping information P2L, corresponding to the committed transaction, among the entire second mapping information P2L managed in the volatile memory may be cleared in step S75. Accordingly, the first mapping information L2P corresponding to the second mapping information P2L, corresponding to the committed transaction, may be stored in the memory blocks 151 to 155.

On the contrary, when the transaction is aborted in step S80 ("YES"), the transaction flag TX_FLAG included in the second mapping information P2L, corresponding to the aborted transaction, among the entire second mapping information P2L managed in the volatile memory may be retained. Accordingly, the first mapping information L2P, corresponding to the second mapping information P2L corresponding to the aborted transaction, may be removed from the first mapping information table 704 in step S85.

In an example of the disclosure, when mapping information generated in a process of storing a plurality of write data in a non-volatile memory device is managed in a volatile memory, a transaction flag indicating whether the write data are grouped into a transaction is set, and then the mapping information is selectively stored in the non-volatile memory device based at least on whether the transaction flag is set.

Through the above-described operations, it is possible to select easily and rapidly the mapping information to be stored in the non-volatile memory device among the mapping information corresponding to the plural write data grouped into the transaction.

Hereinafter, a data processing system and electronic devices which may be constituted with the memory system 110 including the memory device 150 and the controller 130, which are described above by referring to FIGS. 1 to 9, will be described in detail with reference to FIGS. 10 to 18.

FIGS. 10 to 18 are diagrams schematically illustrating application examples of the data processing system of FIGS. 1 to 9 according to various embodiments.

Figure 10:
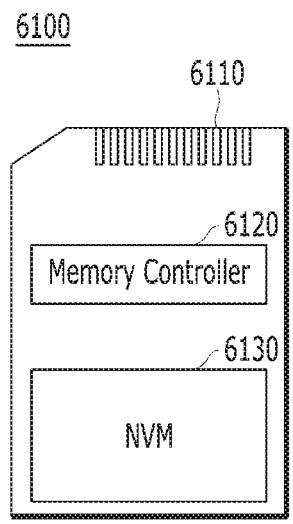
FIGS. 10 to 18 are diagrams schematically illustrating application examples of a data processing system, in accordance with various embodiments of the present invention.

FIG. 10 is a diagram schematically illustrating an example of the data processing system including the memory system in accordance with an embodiment. FIG. 10 schematically illustrates a memory card system including the memory system in accordance with an embodiment.

Referring to FIG. 10, the memory card system 6100 may include a memory controller 6120, a memory device 6130 and a connector 6110.

More specifically, the memory controller 6120 may be connected to the memory device 6130, and may be configured to access the memory device 6130. The memory device 6130 may be embodied by a nonvolatile memory. By the way of example but not limitation, the memory controller 6120 may be configured to control read, write, erase and background operations onto the memory device 6130. The memory controller 6120 may be configured to provide an interface between the memory device 6130 and a host and/or a drive firmware for controlling the memory device 6130. That is, the memory controller 6120 may correspond to the controller 130 in the memory system 110 described with reference to FIGS. 1 to 9, while the memory device 6130 may correspond to the memory device 150 described with reference to FIGS. 1 to 9.

Thus, the memory controller 6120 may include a RAM, a processing unit, a host interface, a memory interface and an error correction unit. The memory controller 130 may further include the elements described in FIG. 1.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with an embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 1.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 11:
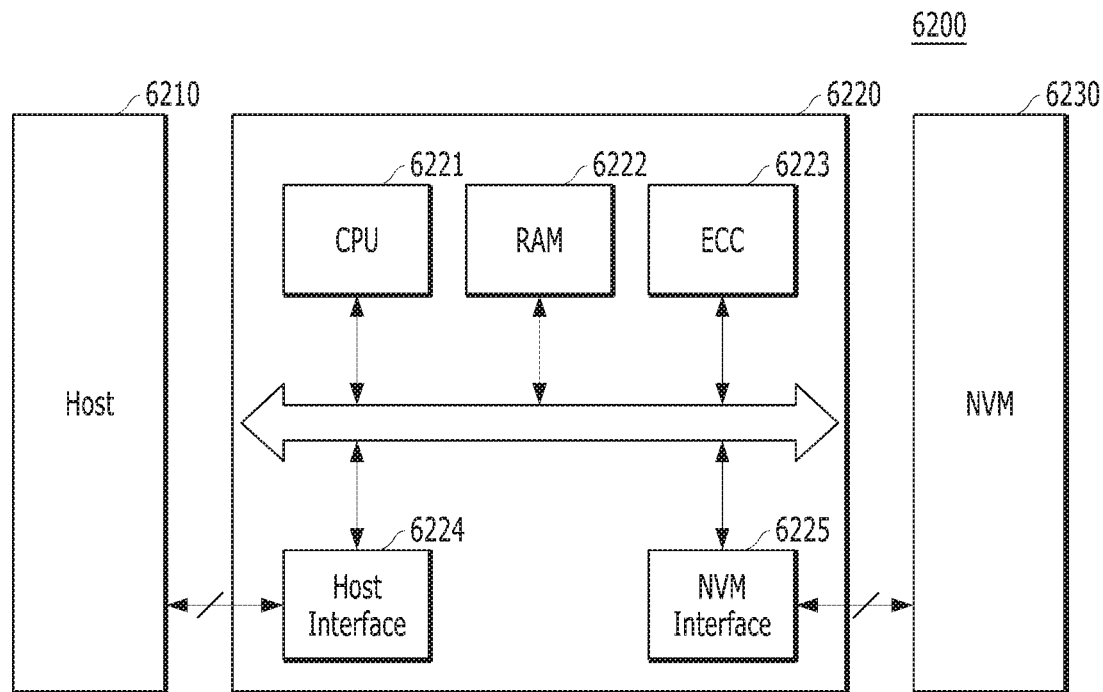

FIG. 11 is a diagram schematically illustrating another example of the data processing system including a memory system, in accordance with an embodiment.

Referring to FIG. 11, the data processing system 6200 may include a memory device 6230 having one or more nonvolatile memories and a memory controller 6220 for controlling the memory device 6230. The data processing system 6200 illustrated in FIG. 11 may serve as a storage medium such as a memory card (CF, SD, micro-SD or the like) or USB device, as described with reference to FIG. 1. The memory device 6230 may correspond to the memory device 150 in the memory system 110 described in FIGS. 1 to 9, and the memory controller 6220 may correspond to the controller 130 in the memory system 110 described in FIGS. 1 to 9.

The memory controller 6220 may control a read, write, or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control the operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. In this case, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit to, or receive from, the host 6210 data or signals through the host interface 6224, and may transmit to, or receive from, the memory device 6230 data or signals through the NVM interface 6225. The host interface 6224 may be connected to the host 6210 through a PATA bus, a SATA bus, a SCSI, an USB, a PCIe, or a NAND interface. The memory controller 6220 may have a wireless communication function with a mobile communication protocol such as WiFi or Long Term Evolution (LTE). The memory controller 6220 may be connected to an external device, e.g., the host 6210, or another external device, and then transmit/receive data to/from the external device. As the memory controller 6220 is configured to communicate with the external device through one or more of various communication protocols, the memory system and the data processing system in accordance with an embodiment may be applied to wired/wireless electronic devices or particularly a mobile electronic device.

Figure 12:
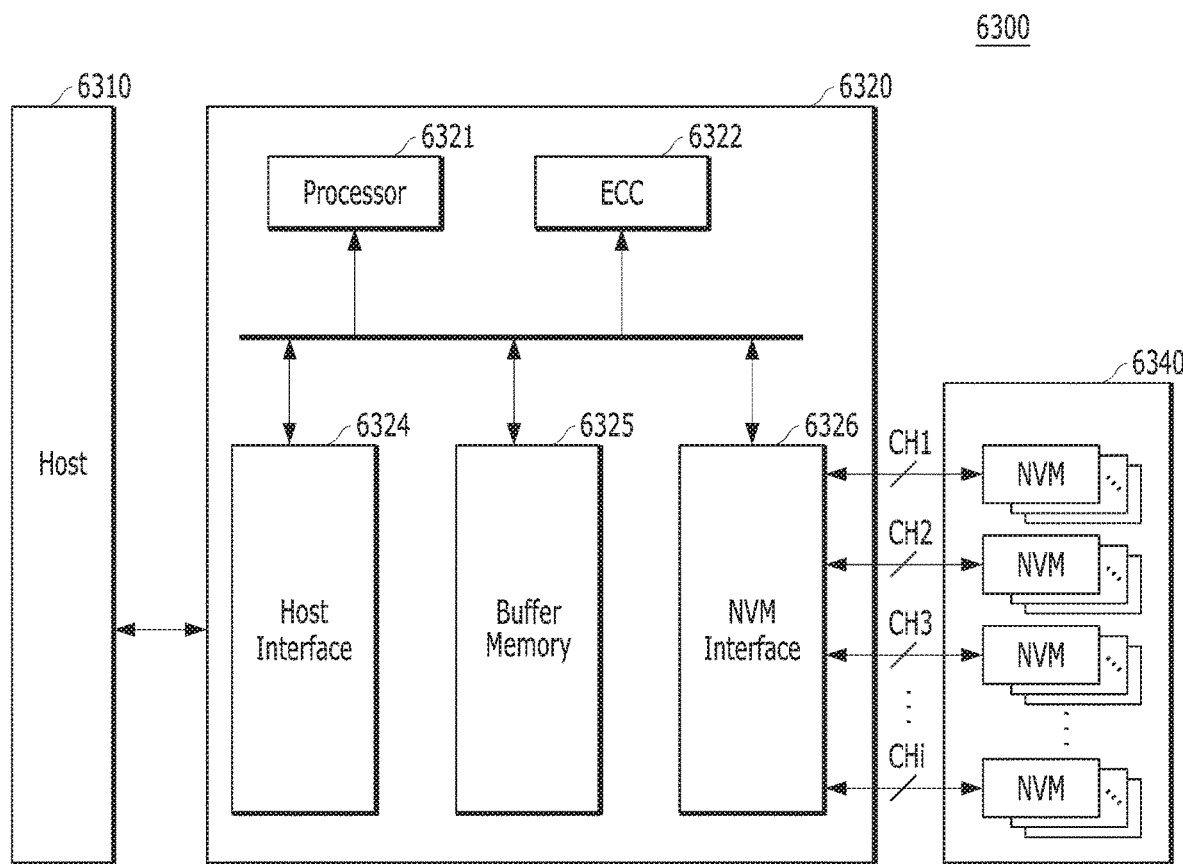

FIG. 12 is a diagram schematically illustrating another example of the data processing system including the memory system in accordance with an embodiment. FIG. 12 schematically illustrates an SSD to which the memory system in accordance with an embodiment is applied.

Referring to FIG. 12, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as a DRAM, an SDRAM, a DDR SDRAM, an LPDDR SDRAM and a GRAM or nonvolatile memories such as an FRAM, a ReRAM, a STT-MRAM and a PRAM. For the purpose of description, FIG. 12 illustrates that the buffer memory 6325 exists in the controller 6320, but the buffer memory 6325 may be located or arranged outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, i.e., RAID level information of the write command provided from the host 6310 in the SSDs 6300, and may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 13:
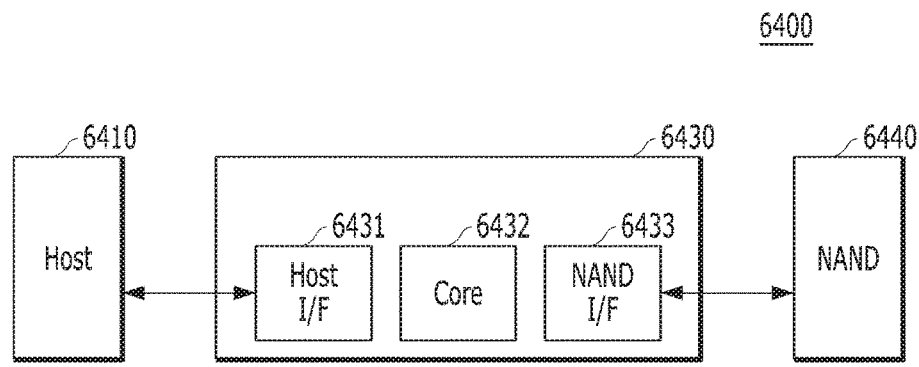

FIG. 13 is a diagram schematically illustrating another example of the data processing system including the memory system in accordance with an embodiment. FIG. 13 schematically illustrates an embedded Multi-Media Card (eMMC) to which the memory system in accordance with an embodiment is applied.

Referring to FIG. 13, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control the operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 14 to 17 are diagrams schematically illustrating other examples of the data processing system including the memory system in accordance with an embodiment. FIGS. 14 to 17 schematically illustrate UFS (Universal Flash Storage) systems to which the memory system in accordance with an embodiment is applied.

Referring to FIGS. 14 to 17, the UFS systems 6500, 6600, 6700 and 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700 and 6800 may communicate with external devices, e.g., wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 10 to 12, and the UFS cards 6530, 6630, 6730, 6830 may be embodied in the form of the memory card system 6100 described with reference to FIG. 10.

Furthermore, in the UFS systems 6500, 6600, 6700 and 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, e.g., UFDs, MMC, SD, mini-SD, and micro-SD.

Figure 14:
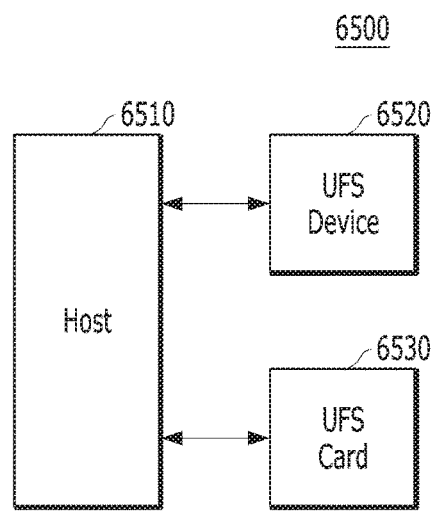

In the UFS system 6500 illustrated in FIG. 14, each of the host 6510, the UFS device 6520 and the UFS card 6530 may include UniPro. The host 6510 may perform a switching operation to communicate with at least one of the UFS device 6520 and the UFS card 6530. The host 6510 may communicate with the UFS device 6520 or the UFS card 6530 through link layer switching, e.g., L3 switching at the UniPro. In this case, the UFS device 6520 and the UFS card 6530 may communicate with each other through a link layer switching at the UniPro of the host 6510. In an example, the configuration in which one UFS device 6520 and one UFS card 6530 are connected to the host 6510 has been exemplified for convenience of description. However, a plurality of UFS devices and UFS cards may be connected in parallel or in the form of a star to the host 6410 (herein, the form of a star means an arrangement that a single device is coupled with plural other devices or cards for centralized control), and a plurality of UFS cards may be connected in parallel or in the form of a star to the UFS device 6520 or connected in series or in the form of a chain to the UFS device 6520.

Figure 15:
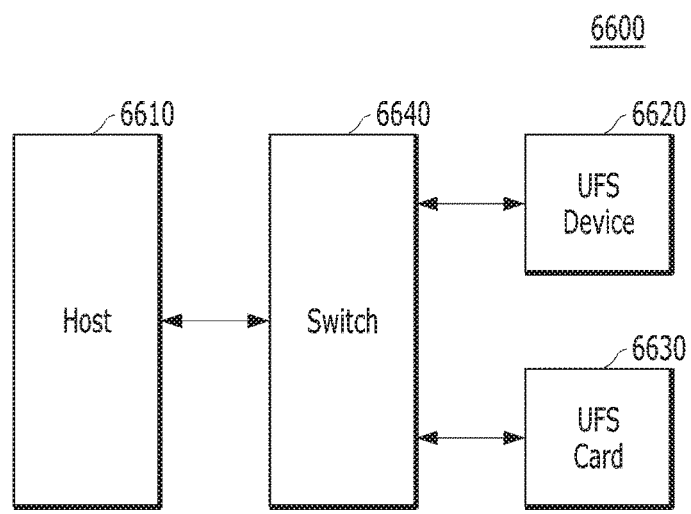

In the UFS system 6600 illustrated in FIG. 15, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In an example, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 16:
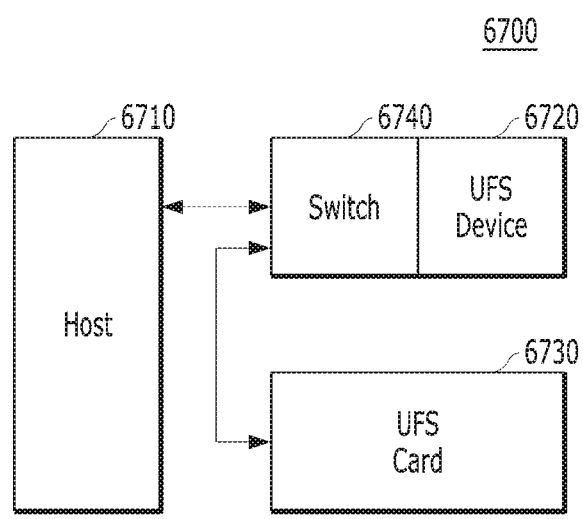

In the UFS system 6700 illustrated in FIG. 16, each of the host 6710, the UFS device 6720 and the UFS card 6730 may include UniPro, and the host 6710 may communicate with the UFS device 6720 or the UFS card 6730 through a switching module 6740 performing a switching operation, for example, the switching module 6740 which performs link layer switching at the UniPro, for example, L3 switching. In this case, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In an example, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 17:
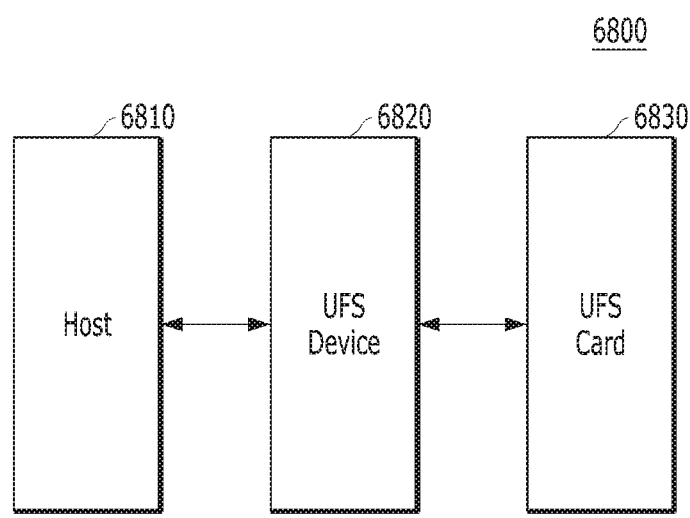

In the UFS system 6800 illustrated in FIG. 17, each of the host 6810, the UFS device 6820 and the UFS card 6830 may include M-PHY and UniPro. The UFS device 6820 may perform a switching operation to communicate with the host 6810 and the UFS card 6830. The UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. Here, the host 6810 and the UFS card 6830 may communicate with each other through target ID switching between the M-PHY and UniPro modules of the UFS device 6820. In an embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 18:
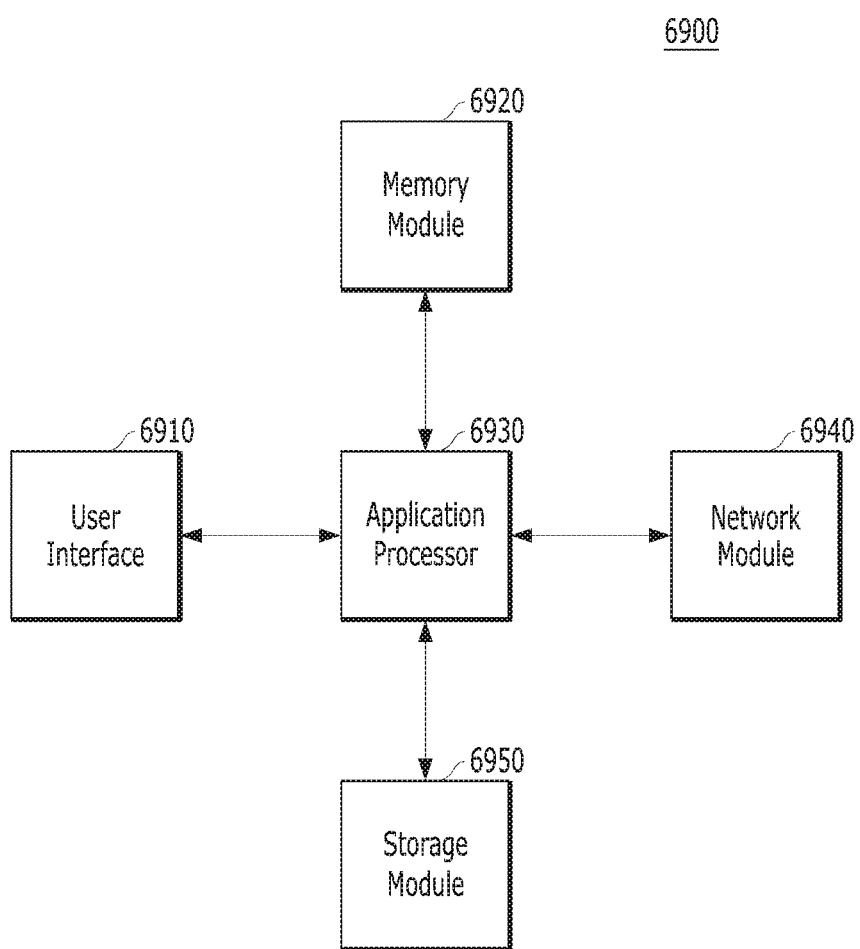

FIG. 18 is a diagram schematically illustrating another example of the data processing system including the memory system in accordance with an embodiment. FIG. 18 is a diagram schematically illustrating a user system to which the memory system in accordance with an embodiment is applied.

Referring to FIG. 18, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as a System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but may also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 12 to 17.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control the operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

While the present invention has been described with respect to specific embodiments, it will be apparent to those skilled in the art that various changes and modifications may be made without departing from the spirit and scope of the invention as determined in the following claims.

What is claimed is:

1. A memory system, comprising:
   a non-volatile memory device including a plurality of memory blocks; and
   a controller comprising a volatile memory and configured to:

store a plurality of write data delivered from a host to the plurality of memory blocks; and manage mapping information corresponding to the stored write data in the volatile memory, wherein the controller is configured to check whether the plurality of write data are grouped into a transaction, selectively set a transaction flag to the mapping information based on a check result; and selectively store the mapping information in the memory blocks when the transaction flag is not set, wherein the mapping information includes first mapping information which is logical to physical information for the write data stored in the memory blocks and second mapping information which is physical to logical information, and wherein the controller is configured to:
 check whether the plurality of write data are grouped into the transaction;
 selectively set the transaction flag to the second mapping information based on a check result; and
 selectively store the first mapping information corresponding to the second mapping information in the memory blocks when the transaction flag is not set to the second mapping information.

2. The memory system of claim 1, wherein the controller is configured to divide the write data into first write data which are grouped into the transaction and second write data which are not grouped into the transaction based on whether or not each of the write data is grouped into the transaction whenever the write data are stored in the memory blocks, and set the transaction flag to the second mapping information corresponding to the first write data among the second mapping information managed in the volatile memory.

3. The memory system of claim 2, wherein the controller is configured to select some of the first mapping information, which corresponds to some of the second mapping information to which the transaction flag is not set among the entire second mapping information managed in the volatile memory, and to store the selected first mapping information in the memory blocks at a first set moment.

4. The memory system of claim 3, wherein the controller is configured to continuously manage the other of the first mapping information, which corresponds to the other of the second mapping information to which the transaction flag is set among the entire second mapping information, in the volatile memory, and
 wherein the other of the first mapping information in the volatile memory is not copied to the memory blocks at the first set moment.

5. The memory system of claim 4, wherein when a transaction of the first write data is committed, the controller is configured to clear the transaction flag, which is set to the second mapping information corresponding to the first write data before a commit moment of the transaction, to a state where the transaction flag is not set.

6. The memory system of claim 4, wherein when a transaction of the first write data is aborted, the controller is configured to retain the transaction flag, which is set to the second mapping information corresponding to the first write data before an abort moment of the transaction, even after the abort moment of the transaction, and remove the first mapping information and second mapping information which correspond to the first write data from the volatile memory.

7. The memory system of claim 4, wherein the controller is configured to select just the second mapping information to which the transaction is not set among the entire second mapping information managed in the volatile memory and store the selected second mapping information in the memory blocks at a second set moment.

8. The memory system of claim 4, wherein the controller is configured to store the entire second mapping information managed in the volatile memory together with information representing whether the transaction flag is set in the memory blocks at a second set moment.

9. The memory system of claim 2, wherein the controller is configured to check whether each of the write data is grouped into the transaction in response to transaction ID information included in write commands corresponding to the write data.

10. An operating method of a memory system including a non-volatile memory device including a plurality of memory blocks and a controller including a volatile memory, the operating method, comprising:
 a first storing step of storing, by the controller, a plurality of write data delivered from a host in the memory blocks; and
 a managing step of managing, by the controller, mapping information, corresponding to the stored write data, stored in the volatile memory,
 wherein the managing step includes:
  a first check step of checking whether the write data are grouped into a transaction;
  a set step of selectively setting a transaction flag to the mapping information with reference to a result of the first check step;
  a second check step of checking whether the transaction flag is set to the mapping information after the set step; and
  a second storing step of selectively storing the mapping information in the memory blocks with reference to a result of the second check step,
 wherein the mapping information includes first mapping information which is logical to physical information for the write data stored in the memory blocks and second mapping information which is physical to logical information,
 wherein the set step is performed by selectively setting the transaction flag to the second mapping information with reference to the result of the first check step,
 wherein the second check step is performed by checking whether the transaction flag is set to the second mapping information, and
 wherein the second storing step is performed by selectively storing the first mapping information corresponding to the second mapping information in the memory blocks with reference to the result of the second check step.

11. The operating method of claim 10,
 wherein the first check step is performed by dividing the write data into first write data which are grouped into the transaction and second write data which are not grouped into the transaction based on a result of checking whether each of the write data is grouped into the transaction whenever the write data are stored in the memory blocks, and
 wherein the set step includes setting the transaction flag to the second mapping information corresponding to the first write data among the second mapping information managed in the volatile memory with reference to the result of the first check step.

12. The operating method of claim 11, wherein the second storing step is performed by selecting just the first mapping information corresponding to the second mapping information to which the transaction flag is not set among the entire second mapping information managed in the volatile memory with reference to the result of the second check step and storing the selected first mapping information in the memory blocks at a first set moment.

13. The operating method of claim 12, wherein the second storing step is performed by not storing the first mapping information corresponding to the second mapping information to which the transaction flag is set among the entire second mapping information managed in the volatile memory in the memory blocks with reference to the result of the second check step and continuing to manage the first mapping information in the volatile memory at the first set moment.

14. The operating method of claim 13, further comprising:
a third check step of checking whether a transaction of the first write data is committed,
wherein the set step is performed by clearing the transaction flag, which is set to the second mapping information corresponding to the first write data before a commit moment of the transaction, to a state where the transaction flag is not set when it is checked that the transaction of the first write data is committed, with reference to a result of the third check step.

15. The operating method of claim 13, further comprising:
a fourth check step of checking whether a transaction of the first write data is aborted; and
a deleting step of deleting the first mapping information and second mapping information which correspond to the first write data from the volatile memory when it is checked that the transaction of the first write data is aborted, with reference to a result of the fourth check step after the set step,
wherein the set step is performed by retaining the transaction flag, which is set to the second mapping information corresponding to the first write data before an abort moment of the transaction, even after the abort moment of the transaction when it is checked that the transaction of the first write data is aborted, with reference to the result of the fourth check step.

16. The operating method of claim 13, wherein the second storing step is performed by selecting just the second mapping information to which the transaction is not set among the entire second mapping information managed in the volatile memory and storing the selected second mapping information in the memory blocks at a second set moment.

17. The operating method of claim 13, wherein the second storing step is performed by storing the entire second mapping information managed in the volatile memory together with information representing whether the transaction flag is set in the memory blocks at a second set moment.

18. The operating method of claim 11, wherein the first check step is performed by checking whether each of the write data is grouped into the transaction in response to transaction ID information included in write commands corresponding to the write data.

19. A memory system, comprising:
a non-volatile memory device including a plurality of memory blocks; and
a controller, electrically coupled with the non-volatile memory device and having a volatile memory device, and configured to:
write a write data in at least one memory block based on a mapping information stored in volatile memory;
check whether a plurality of write data are grouped into a transaction;
selectively set a transaction flag to corresponding mapping information based on a check result; and
selectively update the mapping information, which is not set by the transaction flag, to the memory blocks,
wherein the mapping information includes first mapping information which is logical to physical information for the write data stored in the memory blocks and second mapping information which is physical to logical information, and
wherein the controller is configured to:
check whether the plurality of write data are grouped into the transaction;
selectively set the transaction flag to the second mapping information based on a check result; and
selectively store the first mapping information corresponding to the second mapping information in the memory blocks when the transaction flag is not set to the second mapping information.

* * * * *